(12) United States Patent
Ishikawa et al.

(10) Patent No.: US 6,685,311 B2
(45) Date of Patent: Feb. 3, 2004

(54) INK-JET INK, INK-JET CARTRIDGE, INK-JET RECORDING UNIT AND INK-JET RECORDING APPARATUS

(75) Inventors: Wataru Ishikawa, Hino (JP); Toshiyuki Takabayashi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/180,431

(22) Filed: Jun. 25, 2002

(65) Prior Publication Data

US 2003/0128264 A1 Jul. 10, 2003

(30) Foreign Application Priority Data

| Jun. 26, 2001 | (JP) | 2001-192697 |
| Jun. 27, 2001 | (JP) | 2001-194447 |
| Jun. 27, 2001 | (JP) | 2001-194448 |
| Jun. 29, 2001 | (JP) | 2001-198456 |

(51) Int. Cl.$^7$ .................................................. B41J 2/01
(52) U.S. Cl. ........................ 347/100; 347/96; 106/31.13
(58) Field of Search ............................. 347/100, 101, 347/96, 95; 106/31.13, 31.6, 31.27

(56) References Cited

U.S. PATENT DOCUMENTS

| 4,948,700 | A | * | 8/1990 | Maeda et al. ............... 430/280 |
| 5,041,161 | A | * | 8/1991 | Cooke et al. ................. 347/99 |
| 6,092,890 | A | * | 7/2000 | Wen et al. .................. 347/101 |
| 6,467,897 | B1 | * | 10/2002 | Wu et al. ................... 347/102 |
| 6,500,495 | B2 | * | 12/2002 | Lutz .......................... 427/500 |

FOREIGN PATENT DOCUMENTS

EP          0594081 A2  *  4/1994  .............. B41J/2/01

* cited by examiner

Primary Examiner—Stephen D. Meier
Assistant Examiner—Manish Shah
(74) Attorney, Agent, or Firm—Squire, Sanders & Dempsey, L.L.P.

(57) ABSTRACT

An ink-jet ink comprising a photopolymerizable compound, a photopolymerization initiator and a colorant, wherein the ink has a viscosity of 500 to 50,000 mPa·s at 25° C. and a viscosity of 3 to 30 mPa·s at 80° C.

37 Claims, 1 Drawing Sheet

INK-JET INK, INK-JET CARTRIDGE, INK-JET RECORDING UNIT AND INK-JET RECORDING APPARATUS

FIELD OF THE INVENTION

The present invention relates to an ink which exhibits excellent recording properties onto various media including non-ink absorptive media, a recording method using the same, an ink-jet recording method, an ink cartridge, a recording unit, and an ink-jet recording apparatus.

BACKGROUND OF THE INVENTION

Conventionally employed as ink compositions (hereinafter simply referred to as ink) for ink-jet recording have widely been water-soluble liquid ink compositions. Further, a hot-melt type ink-jet recording system is proposed in which a hot-melt type ink composition, comprised of solid wax at room temperature as a component, is employed; is liquefied by heating; is ejected by application of any kind of energy; and adhered onto a recording medium followed by being cooled and solidified so as to form recorded dots. Features of said ink are as follows. Since said ink is solid at room temperature, no staining results during handling. Further, since it is possible to minimize its evaporation amount during melting, nozzles do not clog. Further said ink exhibits the following advantages. Since said ink is solidified immediately after adhesion onto a medium, no bleeding occurs. As a result, it is possible to employ various recording media such as traditional Japanese paper, drawing paper, post cards, and plastic sheets without any pretreatment. U.S. Pat. Nos. 4,391,369 and 4,484,948 disclose ink compositions which result in desired printing quality irrespective of paper quality.

Further, Japanese Patent Publication Open to Public Inspection No. 56-93776 discloses a UV curable resin type ink composition which exhibits desired adhesion onto metal surfaces. Still further, as ink for ink-jet recording which is subjected to UV curing, U.S. Pat. No. 4,228,438 discloses an ink which is comprised of an epoxy modified acrylic resin and a urethane modified acrylic resin as binders, and pigments having a particle diameter of less than or equal to 5 $\mu$m as a coloring component. Japanese Patent Publication Open to Public Inspection No. 58-32674 discloses an ink which employs a cationically polymerizable epoxy resin as a binder, and Japanese Patent Publication Open to Public Inspection No. 5-186725 describes an ink which employs water-soluble or non-water-soluble dyes. Said patents disclose ink which is easily applied to recording onto common paper as well as recycled paper.

When the ink, as described above, is employed, it becomes difficult to print onto recording media which are not ink absorptive. When special paper is employed, a large-scaled ink drying device is required. Further, problems occur in which since it is difficult to carry out fine and accurate printing due to bleeding and to obtain desired resolution, the use is limited.

It is possible to carry out high speed printing by employing hot-melt type ink, comprised of a wax. However, it has been difficult to obtain durability after printing due to low abrasion resistance. Further, a system, in which a recording composition is merely cured employing ultraviolet rays, results in an insufficient curing rate, difficulty of very fine and accurate printing due to bleeding, and limited resolution.

On the other hand, when coloring agents (colorants) are employed in an ink composition for ink-jet printing, problems occur in which separation tends to occur at a fused state. As is well known, sedimentation of particles, dispersed in a medium, varies depending upon the diameter of said particles, the viscosity of the dispersion medium, and the sedimentation time. The higher the viscosity of the dispersion medium, the less sedimentation occurs. On the other hand, when printing is carried out employing an ink-jet printer, a lower viscosity of the employed ink is suitable for highly reliable printing due to advantages for an increase in a printing rate as well as an increase in density. However, both of these characteristics conflict with each other.

An ink-jet recording system, in which organic pigments are employed as a coloring agent, exhibit many advantages, especially in lightfastness, compared to an ink-jet recording system employing dyes. As a result, the former has been applied to OA equipment, general home printers, and office printers such as facsimile machines. In addition, it is now expected that ink-jet recording is applied for interior and exterior posters, sign boards, cars, glass, decorations of walls and buildings and further onto textiles. Accordingly, it has been urgently demanded to solve each of the aforesaid problems.

SUMMARY OF THE INVENTION

From the viewpoint of the foregoing, the present invention was achieved. An object of the present invention is to provide an ink which attains marked excellence in ink stability, bleeding resistance, and stability (abrasion resistance) after printing, an ink-jet recording method, an ink cartridge, a recording unit, and an ink-jet recording apparatus.

The aforesaid object of the present invention was achieved employing the following embodiments.

1. An ink-jet ink comprising a photopolymerizable compound, a photopolymerization initiator and a colorant,
   wherein the ink has a viscosity of 500 to 50,000 mPa·s at 25° C. and a viscosity of 3 to 30 mPa·s at 80° C.
2. The ink of item 1, wherein the colorant is a pigment.
3. An ink-jet recording method, comprising the steps of:
   (a) jetting the ink of item 1 through a nozzle of an ink-jet head by heating the ink to 60 to 180° C. onto an image recording medium having a temperature of 15 to 40° C.; and
   (b) applying an actinic ray to the image recording medium after the jetting step.
4. The ink-jet recording method of item 3,
   wherein the actinic ray is a ultraviolet ray.
5. The ink-jet recording method of item 3,
   wherein the ink-jet head ejects the ink by an effect of piezoelectric action.
6. The ink-jet recording method of item 3,
   wherein the image recording medium is not ink-absorptive.
7. An ink cartridge comprising an ink housing section which stores the ink of item 1.
8. An ink-jet recording unit comprising an ink storing section which stores the ink of item 1 and an ink-jet head section which ejects droplets of the ink.
9. The ink-jet recording unit of item 8, wherein the ink-jet head section comprises an ink-jet head which ejects the ink by an effect of piezoelectric action of the head.
10. An ink-jet recording apparatus comprising the ink cartridge of item 7, wherein recording is carried out by adhering ink droplets formed by an ink-jet system onto an ink-jet recording medium.
11. An ink-jet recording apparatus comprising the ink-jet recording unit of item 8, wherein recording is carried out by jetting the ink onto an ink-jet recording medium.
12. The ink-jet recording apparatus of item 11, wherein the apparatus comprises a means for irradiating ultraviolet rays onto the ink-jet recording medium.
13. The ink-jet ink of item 1, wherein the ink has a surface tension of 20 to 60 mN/m.
14. The ink-jet ink of item 13, wherein the colorant is a pigment and the content of the pigment is 0.5 to 30 weight % of the ink.
15. The ink-jet ink of item 13, wherein the colorant is dispersed in a vehicle and has an average particle size of not more than 200 nm.
16. The ink-jet ink of item 13, wherein the ink-jet ink comprises at least two kinds of photopolymerizable compounds having a different number of photopolymerizable groups.
17. The ink-jet ink of item 16, wherein a weight ratio of a photopolymerizable compound having one photopolymerizable group to photopolymerizable compounds having a plurality of photopolymerizable groups is 0:100 to 50:50.
18. The ink-jet ink of item 13, wherein the ink-jet ink has a pH value of 4 to 10.
20. An ink-jet recording method, comprising the steps of:
   (a) jetting the ink of item 13 through a nozzle of an ink-jet head by heating the ink to 60 to 180° C. onto an image recording medium having a temperature of 15 to 40° C.; and
   (b) applying an actinic ray to the image recording medium after the jetting step.
21. The ink-jet recording method of item 20, wherein the actinic ray is a ultraviolet ray.
22. The ink-jet recording method of item 20, wherein the ink-jet head ejects the ink by an effect of piezoelectric action.
23. The ink-jet recording method of item 20, wherein the recording medium is not ink-absorptive.
24. The ink-jet ink of item 1, wherein the ink further comprises a cationically polymerizable compound.
25. The ink-jet ink of item 24, wherein the ink has a surface tension of 27 to 65 mN/m.
26. The ink-jet ink of item 24, wherein the colorant is a pigment.
27. The ink-jet ink of item 24, wherein the ink contains 30 to 95 weight % of the photopolymerizable compound, and the weight ratio of the photopolymerizable compound to the photopolymerizable initiator is 100:0.01 to 100:20, and the weight ratio of the photopolymerizable compound to the acid polymerizable compound is 100:5 to 100:30.
28. An ink-jet recording method, comprising the steps of:
   (a) providing an image recording medium in a form of a roll;
   (b) jetting the ink of item 24 through a plurality of ink-jet heads onto the image recording medium; and
   (c) hardening the ink on the image recording medium by irradiation with an actinic ray or by heating.
29. The ink-jet recording method of item 28, wherein the image recording medium is not ink-absorptive.
30. The ink-jet recording method of item 28, wherein a contact angle of the ink jetted onto the recording medium is in a rang of 20 to 70° at 25° C.
31. The ink-jet recording method of item 28, wherein a surface of the recording medium is heated to 10 to 30° C. during the jetting step of the ink.
32. The ink-jet recording method of item 31, wherein the temperature of the surface of the recording medium is regulated based on the amount of data contained in one sheet which is to be recorded.
33. An ink-jet recording method, comprising the steps of:
   (a) jetting the ink of item 1 through a nozzle of an ink-jet head by heating the ink to 60 to 180° C. onto an image recording medium having the temperature of 15 to 40° C.; and
   (b) applying an actinic ray to the image recording medium after the jetting step,
   wherein the ink contains no wax.
34. The ink-jet recording method of item 33, wherein the temperature of the surface of the recording medium is regulated based on the amount of data contained in one sheet which is to be recorded.
35. The ink-jet recording method of item 33, wherein the recording medium is not ink-absorptive.
36. The ink-jet recording method of item 33, wherein a contact angle of the ink jetted onto the recording medium is in a rang of 20 to 70° at 25° C.

The inventors of the present invention conducted diligent investigations to overcome the aforesaid problems. As a result, the following was discovered. By adjusting the viscosity of ink, comprising at least a photopolymerizable compound, a photopolymerization initiator and a coloring agent, to 500 to 50,000 mPa·s at 25° C. as well as to 3 to 30 mPa·s at 80° C., it was possible to carry out high speed recording in the same manner as for hot-melt type ink employing wax. Further, poor abrasion resistance, which had been problematic in the use of said hot-melt type ink, was markedly improved. In a method which cured an ink composition merely employing ultraviolet rays, it was difficult to minimize bleeding. However, the constitution of the present invention markedly minimized bleeding, especially bleeding which occurred when non-ink absorptive recording media were employed. Accordingly, the present invention was achieved.

DETAILED DESCRIPTION OF THE INVENTION

Figure 1:
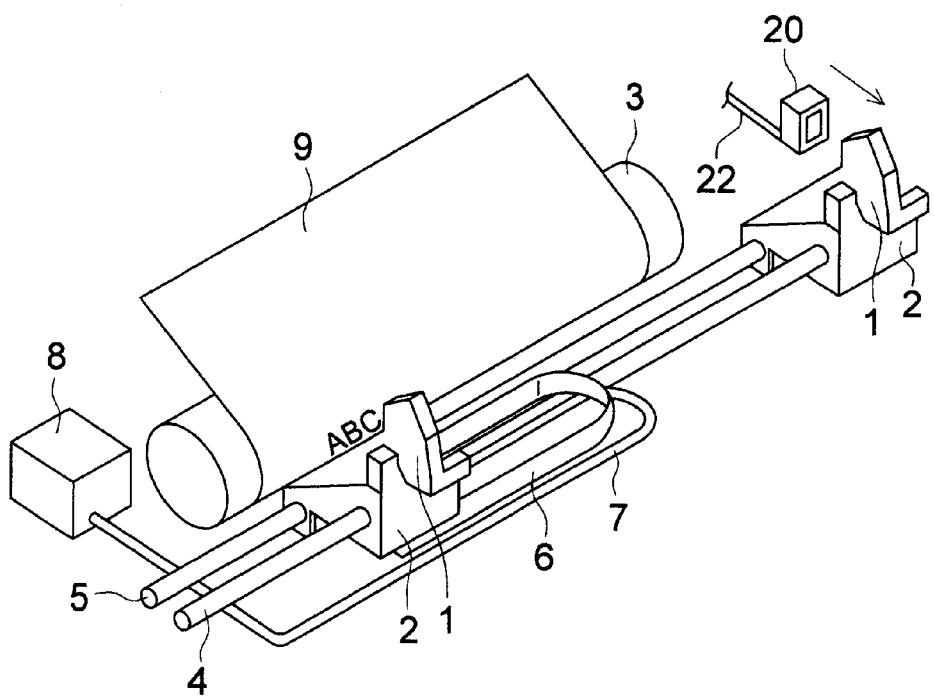
FIG. 1 is a perspective view showing one example of the ink-jet recording apparatus of the present invention.

The present invention will now be detailed.

The present invention is characterized in that the viscosity of ink, comprising at least a photopolymerizable compound, a photopolymerization initiator, and a coloring agent, is from 500 to 50,000 mPa·s at 25° C. as well as from 3 to 30 mPa·s at 80° C.

The ink of the present invention is a viscous liquid having a viscosity of 500 to 50,000 mPa·s at 25° C. and 3 to 30 mPa·s at 80° C. Said viscosity is preferably from 500 to 10,000 mPa·s at 25° C. and is more preferably 1,000 to 10,000 mPa·s. When said viscosity is less than 500 mPa·s, bleeding increases, while when said viscosity exceeds 50,000 mPa·s, the flatness of images is degraded. Said viscosity at 80° C. is preferably from 3 to 30 mPa·s, and is more preferably from 3 to 20 mPa·s. When said viscosity is less than 3 mPa·s, problems occur at high speed ejection, while when said viscosity exceeds 30 mPa·s, ejection properties are degraded.

Methods for measuring the viscosity at each temperature specified by the present invention are not particularly limited. The desired viscosity characteristics may be obtained by suitably adjusting the concentration of each additive (being a photopolymerizable compound, a photopolymerization initiator, and a coloring agent), the amount of solvents, and viscosity modifiers.

The viscosity (being the coefficient of viscosity of a liquid), as described in the present invention, is not particularly limited as long as said viscosity is calibrated employing the standard liquid for calibrating a viscometer, specified by JIS Z 8809. It is possible to employ a rotation type, vibration type, or capillary type viscometer. It is possible to use a Saybolt viscometer or a Redwood viscometer. Listed as viscometers may be conical flat board type E type viscometer, manufactured by TOKIMEC Inc., an E Type Viscometer (being a rotational viscometer), manufactured by Tohki Sangyo Co., a B Type Viscometer BL, manufactured by Tokyo Keiki Co., an FVM-80A, manufactured by Yamaichi Denki Co., a Viscoliner, manufactured by Nametre Kogyo Co., and a VISCO MATE Model VM-1A, manufactured by Yamaichi Denki Co.

In the present invention, a recording method is characterized in that the ink of the present invention is heated from 60 to 180° C.; said ink is provided with ejection energy so that ink droplets are ejected to form an image; the resultant image is fixed on a recording medium maintained from 15 to 40° C.; and then provided with actinic radiation. The ink temperature, when ink droplets are ejected, is preferably from 60 to 180° C., and is more preferably from 80 to 120° C. When said temperature is less than or equal to 60° C. or more than or equal to 180° C., ink injection becomes difficult. The temperature of a recording medium, onto which ink droplets are ejected to form an image, is to be from 15 to 40° C. When said temperature is at least 40° C., the resultant image is markedly degraded, due to bleeding. The invention according to claims 5, 12, and 13, is characterized in that recording is carried out by adhering onto a recording medium ink droplets formed by an ink-jet system, employing the ink, the ink cartridge, and the recording unit of the present invention.

In the present invention, a system is characterized in that as a driving force for ink ejection of an ink-jet printer, the piezoelectric action of a piezoelectric body is employed which exhibits a wide application range to ink. Specifically, for example, Japanese Patent Publication No. 4-48622 describes an ink-jet head system in which an electrode layer is formed in the interior of minute grooves formed on a piezoelectric substrate, and an ink flow path is prepared by covering said grooves employing an insulation layer.

In the ink-jet recording method of the present invention, after adhering an ink composition onto a recording medium, radiation is applied to the adhered ink composition. Said radiation may be either-visible light or ultraviolet radiation. The invention according to claims 4 and 14 is characterized in that actinic radiation is ultraviolet radiation. When ultraviolet radiation is applied, the exposure amount of said ultraviolet radiation is commonly in the range of 100 to 10,000 mJ/cm$^2$, and is preferably in the range of 500 to 5,000 mJ/cm$^2$. The exposure amount of the ultraviolet radiation in the aforesaid range is capable of undergoing sufficient curing reaction. Further, it is advantageous since it is possible to minimize the discoloration of coloring agents. Listed as radiation sources for the exposure of ultraviolet radiation are lamps such as a metal halide lamp, a xenon lamp, a carbon arc lamp, a chemical lamp, and a low-pressure and high-pressure mercury lamp. For example, it is possible to employ commercially available lamps such as H Lamp, D Lamp, and V-Lamp, manufactured by Fusion System Co. Compared to the high-pressure mercury lamp, (having a main wavelength of 365 nm), the metal halide lamp has a continuous spectrum, exhibits high emission efficiency in the range of 200 to 450 nm and has an ample long wavelength region. Accordingly, when an ink composition is comprised of pigments as in the present invention, said metal halide lamp is suitable.

The present invention is characterized in that a recording medium is not ink-absorptive.

The non-ink absorptive recording medium, as described in the present invention, refer to a recording medium which exhibits no ink absorbability, a recording medium which exhibits low ink absorbability, or a recording medium comprising a support having thereon a surface layer (being a recording layer) comprised of non-ink absorptive or low-ink absorptive materials. Said non-ink absorptive or low-ink absorptive materials include various types of plastics and metals.

Photopolymerizable compounds, as well as photopolymerization initiators, are incorporated in the ink of the present invention. Photopolymerizable compounds, as described herein, refer to radical polymerizable compounds. For example, photocurable materials employing photopolymerizable compositions and cationically polymerization based photocurable resins are known, which are described in Japanese Patent Publication Open to Public Inspection No.7-159983, Japanese Patent Publication No. 7-31399, Japanese Patent Publication Open to Public Inspection Nos. 8-224982 and 10-863, and Japanese Patent Application No. 7-231444. Recently, cationic polymerization based photocurable resins which are sensitized to the wavelength region longer than visible light are disclosed in, for example, Japanese Patent Publication Open to Public Inspection Nos. 6-43633 and 8-324137.

Radical polymerizable compounds are those having a radical polymerizable ethylenic unsaturated bond, which may include any compound which has at least one radical polymerizable ethylenic unsaturated bond in the molecule. Said compounds include those having a structure such as monomers, oligomers, and polymers. Said radical polymerizable compounds may be employed individually, or in order to enhance desired characteristics, may be employed in combinations of two or more types, at an optional ratio.

Listed as examples of compounds having a radical polymerizable ethylenic unsaturated bond are unsaturated carboxylic acids such as acrylic acid, methacrylic acid, itaconic acid, crotonic acid, isocrotonic acid, and maleic acid, and salts thereof, esters, urethane, amides and anhydrides, acrylonitrile, styrenes, and further radical polymerizable compounds such as various types of unsaturated polyesters, unsaturated polyethers, unsaturated polyamides, and unsaturated urethanes. Specifically, listed are acrylic acid derivatives such as 2-ethylhexyl acrylate, 2-hydroxyethyl acrylate, butoxyethyl acrylate, carbitolacrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, trimethylene glycol diacrylate, tetraethylene glycol diacrylate, polyethylene glycol diacrylate, polypropylene glycol diacrylate, pentaerythritol acrylate, pentaerythritol tetraacrylate, dipentaerythritol tetraacrylate, trimethylolpropane triacrylate, teramethylolmethane tetraacrylate, oligoester acrylate, N-methylolacrylamide, diacetone acrylamide, and epoxyacrylate; methacrylic derivatives such as methyl methacrylate, n-butyl methacrylate, 2-ethylhexyl methacrylate, lauryl methacrylate, allyl methacrylate, glycidyl methacrylate, benzyl methacrylate, dimethyl aminomethyl methacrylate, 1,6-hexanediol dimethacrylate, ethylene glycol dimethacrylate, trimethylene glycol dimethacrylate, polyethylene glycol methacrylate, propylene glycol dimethacrylate, trimethylolethane trimethacrylate, trimethylolpropane trimethacrylate, 2,2-bis(4-methacryloxypolyethoxyphenyl)propane; and derivatives of allyl compounds such as allyl glycidyl ether, diallyl phthalate, and triallyl trimeryate. Further, it is specifically possible to employ commercially available products, as well as radical polymerizable or crosslinking monomers, oligomers and polymers, known in the industry, which are described in "Kakyozai Handbook (Crosslinking Agent Handbook)" edited by Shinzo Yamashita (Taisei Sha, 1981); "UV•EB Koka Handbook (Genryo Hen) (UV•EB Curing Handbook (Raw Material Section)", edited by Kiyoshi Katoh (Kohbunshi Kankohkai, 1985); "UV•EB Kohka Gijutsu no Ohyoh to Shijo (Application and Market of UV•EB Curing Techniques)", edited by Radotech Kenkyu Kai, page 79 (CMC, 1989); and Ehichiroh Takiyama "Polyester Jushi Handbook (Polyester Resin Handbook)", (Nikkan Kogyoshinbun Co., 1988). The added amount of the aforesaid radical polymerizable compounds is preferably from 1 to 97 percent by weight, and is more preferably from 30 to 95 percent by weight.

Listed as radical polymerization initiators are triazine derivatives described in Japanese Patent Publication Nos. 59-1281 and 61-9621, and Japanese Patent Publication Open to Public Inspection No. 60-60104; organic peroxides described in Japanese Patent Publication Open to Public Inspection Nos. 59-1504 and 61-243807; diazonium compounds described in Japanese Patent Publication Nos. 43-23684, 44-6413, 44-6413, and 47-1604, and U.S. Pat. No. 3,567,453; organic azide compounds described in U.S. Pat. Nos. 2,848,328, 2,852,379, and 2,940,853; ortho-quinonediazide compounds described in Japanese Patent Publication Nos. 36-22062, 37-13109, 38-18015, and 45-9610; various types of onium compounds described in Japanese Patent Publication No. 55-39162 and Japanese Patent Publication Open to Public Inspection No. 59-14023, and "Macromolecules" Volume 10, page 1307 (1977); azo compounds described in Japanese Patent Publication Open to Public Inspection No. 59-142205; metal allene complexes described in Japanese Patent Publication Open to Public Inspection No. 1-54440, European Pat. Nos. 109, 851 and 126,712, and "Journal of Imaging Science" Volume 30, page 174 (1986); (oxo)sulfonium organic boron complexes described in Japanese Patent Application Nos. 4-56831 and 4-89535; thitanocenes described in Japanese Patent Publication Open to Public Inspection No. 61-151197; transition metal complexes comprising transition metals such as ruthenium described in "Coordination Chemistry Review", Volume 84, pages 85 through 277 (1988), and Japanese Patent Publication Open to Public Inspection No. 2-182701; 2,4,5-triarylimidazole dimer and carbon tetrabromide described in Japanese Patent Publication Open to Public Inspection No. 3-209477; and organic halogen compounds described in Japanese Patent Publication Open to Public Inspection No. 59-107344. The content of these polymerization initiators is preferably in the range of 0.01 to 100 parts by weight with respect to 100 parts by weight of the compound having a radical polymerizable ethylenic unsaturated bond.

Listed as cationic polymerization-based photocurable resins may be UV curing prepolymers of the type (mainly being an epoxy type) which undergoes polymerization due to cationic polymerization, and prepolymers having at least two epoxy groups in one molecule as a monomer. Listed as such prepolymers may be, for example, alicyclic polyepoxides, polyglycidyl esters of polybasic acids, polyglycidyl ethers of polyhydric alcohols, polyglycidyl ethers of polyoxyalkylene glycol, polyglycidyl ethers of aromatic polyols, hydrogenated compounds of polyglycidyl ethers of aromatic polyols, urethane polyepoxy compounds and epoxylated polybutadine. Types of these polymers may be employed individually or in combinations of two or more types.

Further, listed as cationically polymerizable compounds incorporated in cationically polymerizable compositions may be (1) styrene derivatives, (2) vinyl naphthalene derivatives, (3) vinyl ethers, and (4) N-vinyl compounds, as all described below.
(1) Styrene Derivatives For example, styrene, p-methylstyrene, p-methoxystyrene, β-methylstyrene, p-methyl-β-methylstyrene, α-methylstyrene, and p-methoxy-β-methylstyrene
(2) Vinyl Naphthalene Derivatives For example, 1-vinylnaphthalene, α-methyl-1-vinylnaphthalene, βmethyl-1-vinylnaphthalene, 4-methyl-1-vinylnaphthalene, and 4-methoxy-1-vinylnaphtalene
(3) Vinyl Ethers For example, isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, and β-chloroisobutyl vinyl ether
(4) N-Vinyl Compounds For example, N-vinylcarbazole, N-vinylpyrrolidone, N-vinylindole, N-vinylpyrrole, N-vinylphenothiazine, N-vinylacetanilide, N-vinylacetamide, N-vinylsuccinimide, N-vinylphthalimide, N-vinylcaprolactam, and N-vinylimidazole The content ratio of the aforesaid cationically polymerizable compounds in said cationically polymerizable composition is preferably from 1 to 97 percent by weight, and is more preferably from 30 to 95 percent by weight.

Listed as initiators of cationic polymerization based photocurable resins may be aromatic onium salts. Listed as said aromatic onium salts may be salts of Va Group elements in the Periodic Table, for example, phosphonium salts (for example, triphenylphenacylphosphonium hexafluorophosphate), salts of Group VIa elements such as sulfonium salts (for example, triphenylsulfonium tetrafluorophosphate, triphenylsulfonium hexafluorophosphate, tris(4-thiomethoxyphenyl) hexafluorophosphate, and sulfonium and triphenylsulfonium hexysulfoantimonate), and salts of Group VIIa elements such as iodonium salts (for example, diphenyliodonium chloride).

The use of such aromatic onium salts for polymerization of epoxy compounds is detailed in U.S. Pat. Nos. 4,058,401, 4,069,055, 4,101,513, and 4,161,478.

Listed as preferred cationic polymerization initiators are sulfonium salts of Group VIa elements. Of these, from the viewpoint of UV curability and storage stability of UV curable compositions, triarylphosphonium hexafluoroantimonate preferred. Further, it is optionally possible to employ photopolymerization initiators, known in the art, described on pages 39 through 56 of "Photopolymer Handbook" (edited by Photopolymer Konwa Kai, published by Kogyo Chosa Kai, 1989), as well as compounds described in Japanese Patent Publication Open to Public Inspection Nos. 64-13142 and 2-4804.

In addition to each of the additives described above, the ink of the present invention can comprise other additives such as viscosity modifiers, reaction diluents, fillers, fluidity aids, chixotropy agents, wetting agents, antifoaming agents, and plasticizers. Further, stabilizers such as lightfastness enhancing agents, UV absorbers, antioxidants, polymerization inhibitors, and corrosion inhibitors, or Si based compounds and waxes may be incorporated.

Employed as coloring agents in the ink composition of the present invention may be conventionally known dyes and pigments. However, the invention according to claim 2 is characterized in that coloring agents employed in said ink are pigments.

Listed as water-soluble dyes are, for example, C.I. Direct Black-2, -4, -9, -11, -17, -19, -22, -32, -80, -151, -154, -168, -171, and -194; C.I. Direct Blue-1, -2, -6, -8, -22, -34, -70, -71, -76, -78, -86, -112, -142, -165, -199, -200, -201, -202, -203, -207, -218, -236, and –287; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, and -189; C.I. Direct Yellow-1, -2, -4, -8, -11, -12, -26, -27, -28, -33, -34, -41, -44, -48, -58, -86, -87, -88, -135, -142, and -144; C.I. Food Black-1 and -2; C.I. Acid Black-1, -2, -7, -16, -24, -26, -28, -31, -48, -52, -63, -107, -112, -118, -119, -121, -156, -172, -194, and -208; C.I. Acid Blue-1, -7, -9, -15, -22, -23, -27, -29, -40, -43, -55, -59, -62, -78, -80, -81, -83, -90, -102, -104, -111, -185, -249, and -254; C.I. Acid Red-1, -4, -8, -13, -14, -15, -18, -21, -26, -35, -37, -110, -144, -180, -249, and -257; C.I. Acid Yellow-1, -3, -4, -7, -11, -12, -13, -14, -18, -19, -23, -25, -34, -38, -41, -42, -44, -53, -55, -61, -71, -76, -78, -79, and -122.

Listed as oil-soluble dyes are azo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, naphthalimide dyes, perynone dyes, and phthalocyanine dyes. However, said dyes are not limited to these.

Water-insoluble dyes and pigments of the present invention are not particularly limited and include organic pigments, inorganic pigments, colored polymer particles, water-insoluble dyes, dispersion dyes, and oil-soluble dyes.

Listed as black pigments are carbon black pigments such as furnace black, lamp black, acetylene black, and channel black. The following may also be employed: for example, Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, and Raven 1060 (all the above are manufactured by Columbian Carbon Co.); Regal 1400, Regal 330R, Regal 1660R, Mogul L, Black Pearls L, Monarch 700, Monarch 800, Monarch 880, Monarch 900, Monarch 1000, Monarch 1100, Monarch 1300, and Monarch 1400 (all the above are manufactured by Cabot Co.); Color Black FW1, Color Black FW2, Color Black FW2V, Color Black 18, Color Black FW200, Color Black S150, Color Black S160, Color Black S170, Pritex 25, Pritex U, Pritex Vrintex 1490U, Pritex 140V, Special Black 6, Special Black 5, Special Black 4A, and Special Black 4 (all of which are manufactured by Degussa Corp.); and No. 25, No. 33, No. 40, No. 47, No. 52, No. 900, No. 2300, MCF-88, MA 7, MA 8, and MA 100 (all of which are manufactured by Mitsubishi Kagaku Co.). Further, minute magnetic body particles such as magnetite and ferrite may be used as a black pigment.

Listed as cyan pigments are the following: C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22, and C.I. Pigment Blue-60.

Listed as magenta pigments are the following: C.I. Pigment Red-5, C.I. Pigment Red-7 C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, and C.I. Pigment Red-202.

Listed as yellow pigments are the following: C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151, and C.I. Pigment Yellow-154.

In addition to said black pigments, as well as said cyan, magenta, and yellow pigments which consist of the three primary colors, it is possible to use specified color pigments such as red, green, blue, brown, and white pigments, metallic luster pigments such as gold and silver pigments, colorless extender pigments, and plastic pigments. Further, besides those described above, it is possible to use newly synthesized pigments. Still further, these pigments may be subjected to a surface treatment. Listed as such surface treatment methods are, for example, a treatment by coupling agents such as alcohols, acids, bases, and silane compounds, a polymer graft treatment, and a plasma treatment. Preferred coloring agents employed in the present invention are those which contain minimal organic and inorganic impurities Since commercially available coloring agents contain said impurities in a relatively large amount, it is desirous to use purified products. The proportion of coloring agents employed in said solid ink composition of the present invention is commonly in the range of 0.1 to 20.0 percent by weight with respect to ink weight, and is preferably in the range of 0.4 to 10.0 percent by weight.

In the present invention, it is preferable that the surface temperature of said recording material is adjusted in the range of 15 to 40° C. prior to ink image formation on said recording material until the completion of ink image formation.

In the present invention, after ink at a relatively high temperature is ejected onto a recording material, it is critical that said ink is quickly cooled. For example, there is a method in which when said ink at a relatively high temperature is ejected onto said recording material, the surface temperature of said recording material is adjusted by providing a device which blows cold air onto the surface of said recording material in the process prior to printing by a printing head as well as at the printing initiation area.

Further, there is another method in which the temperature of said recording material is controlled by adjusting the temperature of a guide which comes into contact with the recording material side opposite the printing head for said recording material.

By uniformly adjusting the surface temperature of said recording material to lower than or equal to the specified temperature, image quality is improved compared to the case in which ink is ejected onto a recording material at normal temperature and is subjected to an increase in viscosity through natural cooling. The resultant improvement is markedly pronounced when said recording material is not absorptive.

In the present invention, it is preferable that surface temperature adjusting conditions are set based on recording data equivalent to one page. By so doing, high quality images are consistently obtained being not affected by recording duty.

In the ink-jet recording method of the present invention, a recording material is supplied in the form of a long roll. From the viewpoint of recording material cost such as packaging cost and production cost, print production efficiency, and printing compatibility to various sizes, it is advantageous to employ long roll (web) recording materials.

In the present invention, the contact angle between the ink and the recording material is preferably in the range of 20 to 70 degrees at 25° C.

When said contact angle is less than or equal to 20 degrees, bleeding becomes problematic due to high wettability, while when it exceeds 70 degrees, portions where ink does not get wet are seen as streaks, thereby print quality is degraded.

As known in the art, it is possible to adjust the contact angle by controlling the amount of surface active agents in ink and/or by applying corona discharge to the surface of a recording material.

Said contact angle was determined employing an automatic contact angle measurement apparatus CA-Z Type, manufactured by Kyowa Kaimen Kagaku Co.

In the present invention, after image formation on the recording material, the resultant image is quickly cured. Listed as curing means are ultraviolet radiation (UV) exposure lamps, electron beams, and heat. Said UV exposure lamps generate heat and the recording material may be deformed. Therefore, it is preferable that, for example, cold mirrors, cold filters, and work cooling are installed.

Incidentally, regarding ultraviolet radiation curing technology, many books are available. Listed as one of them is "UV•EV Kohka Gijutsu (UV•EV Curing Technology)", edited by Minoiru Imoto et al., Sohgo Gijutsu Center (1983).

By utilizing said curing, image durability is markedly enhanced and reliability after printing is secured.

The ink-jet recording apparatus of the present invention will now be detailed.

FIG. 1 is a perspective view showing one example of the entire constitution of the ink-jet recording apparatus of the present invention. Ink-jet head 1 is arranged in carriage 2 which is driven to achieve a lateral reciprocating motion along guide rails 4 and 5 which are installed parallel while facing the medium. Ink-jet head 1 is connected to connection cord 6 comprised of a flexible substrate which transmits recording signal pulses, and ink tube 7 which supplies ink from ink tank 8 to ink-jet head 1. During recording, recording medium 9 successively moves upward along the surface of platen 3 while secondary scanning is being carried out. Recording medium 9 is conveyed upward by platen 3 and a plurality of nozzles of ink-jet head 1, which is arranged while facing recording medium 9, ejects ink droplets corresponding to electrical image signals, whereby an image is formed on said recording medium 9. Incidentally, employed as ink-jet head 1 used in the ink-jet recording apparatus, having the embodiment shown in FIG. 1, are optional multi-channel ink-jet heads which are conventionally known.

Further, in FIG. 1, during or after recording, a device is arranged which exposes ultraviolet radiation onto a recording medium which had been printed (not shown in FIG. 1).

EXAMPLES

The present invention will now be detailed with reference to examples. However, the present invention is not limited to the embodiments shown in these examples.

Example 1

<<Preparation of Ink Compositions>>

<Preparation of Ink Unit 1:Present Invention>

(Preparation of Black Ink 1)

| | |
|---|---|
| C.I. Pigment Black 7 | 5 weight parts |
| Photopolymerizable compound: EA-1020 (manufactured by Shin-Nakamura Kagaku Co.) | 90 weight parts |
| Reaction Initiator: Irugacure 184 (manufactured by Ciba-Geigy Japan Ltd.) | 5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Black Ink (K) 1 was prepared. Incidentally, the added amount of diethylene glycol was suitably adjusted so that the viscosity of Black Ink 1 became 20 mPa·s at 80° C.

Viscosity was determined employing a rotational viscometer (manufactured by TOKIMEC Inc.)

(Preparation of Magenta Ink 1)

| | |
|---|---|
| C.I. Pigment Blue 15:3 | 2.5 weight parts |
| Photopolymerizable compound: EA-1020 (manufactured by Shin-Nakamura Kagaku Co.) | 90 weight parts |
| Reaction Initiator: Irugacure 184 (manufactured by Ciba-Geigy Japan Ltd.) | 7.5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Cyan Ink (C) 1 was prepared. Incidentally, the added amount of diethylene glycol was suitably adjusted so that the viscosity of Cyan Ink 1 became 23 mPa·s at 80° C.

(Preparation of Magenta Ink 1)

| | |
|---|---|
| C.I. Pigment Red 122 | 3 weight parts |
| Photopolymerizable compound: EA-1020 (manufactured by Shin-Nakamura Kagaku Co.) | 90 weight parts |
| Reaction Initiator: Irugacure 184 (manufactured by Ciba-Geigy Japan Ltd.) | 7 weight parts |

After adding diethylene glycol to each of said components, the resulting mixture was heated to 80° C. and blended while stirring. Thereafter, the resultant liquid was filtered while heated employing a filter, and subsequently cooled, whereby viscous Magenta Ink (M) 1 was prepared. Incidentally, the added amount of diethylene glycol was suitably adjusted so that the viscosity of Magenta Ink 1 became 23 mPa·s at 80° C.

(Preparation of Yellow Ink 1)

| | |
|---|---|
| C.I. Pigment Yellow 93 | 2.5 weight parts |
| Photopolymerizable compound: EA-1020 (manufactured by Shin-Nakamura Kagaku Co.) | 90 weight parts |
| Reaction Initiator: Irugacure 184 (manufactured by Ciba-Geigy Japan Ltd.) | 7.5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Yellow Ink (Y) 1 was prepared. Incidentally, the added amount of diethylene glycol was suitably adjusted so that the viscosity of Yellow Ink 1 became 20 mPa·s at 80° C.

<Preparation of Ink Unit 2: Present Invention>

Black Ink 2, Cyan Ink 2, Magenta Ink 2, and Yellow Ink 2 were prepared in the same manner as each ink of Ink Unit 1, except that photopolymerizable compound EA-1020 (manufactured by Shin-Nakamura Kagaku Co.) was replaced with A-9300 (also manufactured by Shin-Nakamura Kagaku Co.) and the added amount of ethylene glycol during the preparation of each of black ink, cyan ink, magenta ink, and yellow ink was varied so that the viscosity of each ink at 80° C. became 18, 20, 20, and 18 mPa·s.

<Preparation of Ink Unit 3: Present Invention>

(Preparation of Black Ink 3)

| | |
|---|---|
| C.I. Pigment Black 7 | 5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Reaction Initiator: Irugacure 184 (manufactured by Ciba-Geigy Japan Ltd.) | 5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Black Ink 3 was prepared. Incidentally, the added amount of diethylene glycol was suitably adjusted so that the viscosity of Black Ink 3 became 15 mPa·s at 80° C.

(Preparation of Cyan Ink 3)

| | |
|---|---|
| C.I. Pigment Blue 15:3 | 2.5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Reaction Initiator: Irugacure 184 (manufactured by Ciba-Geigy Japan Ltd.) | 7.5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Cyan Ink 3 was prepared. Incidentally, the added amount of diethylene glycol was suitably adjusted so that the viscosity of Cyan Ink 3 became 17 mPa·s at 80° C.

(Preparation of <Magenta Ink 3)

| | |
|---|---|
| C.I. Pigment Red 122 | 3 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Reaction Initiator: Irugacure 184 (manufactured by Ciba-Geigy Japan Ltd.) | 7 weight parts |

After adding diethylene glycol to each of said components, the resulting mixture was heated to 80° C. and blended while stirring. Thereafter, the resultant liquid was filtered while heated employing a filter, and subsequently cooled, whereby viscous Magenta Ink 3 was prepared. Incidentally, the added amount of diethylene glycol was suitably adjusted so that the viscosity of Magenta Ink 3 became 17 mPa·s at 80° C.

(Preparation of Yellow Ink 3)

| | |
|---|---|
| C.I. Pigment Yellow 93 | 2.5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Reaction Initiator: Irugacure 184 (manufactured by Ciba-Geigy Japan Ltd.) | 7.5 weight parts |

After adding diethylene glycol to each of said components, the resulting mixture was heated to 80° C. and blended while stirring. Thereafter, the resultant liquid was filtered while heated employing a filter, and subsequently cooled, whereby viscous Yellow Ink 3 was prepared. Incidentally, the added amount of diethylene glycol was suitably adjusted so that the viscosity of Yellow Ink 3 became 15 mPa·s at 80° C.

<Preparation of Ink Unit 4: Present Invention>

Black Ink 4, Cyan Ink 4, Magenta Ink 4, and Yellow Ink 4 were prepared in the same manner as each ink of Ink Unit 3, except that the added amount of ethylene glycol during the preparation of each of black ink, cyan ink, magenta ink, and yellow ink was varied so that the viscosity of each ink at 80° C. became 10, 12, 12, and 10 mPa·s, respectively.

<Preparation of Ink Unit 5: Present Invention>

Black Ink 5, Cyan Ink 5, Magenta Ink 5, and Yellow Ink 5 were prepared in the same manner as each ink of Ink Unit 3, except that the added amount of ethylene glycol during the preparation of each of black ink, cyan ink, magenta ink, and yellow ink was varied so that the viscosity of each ink at 80° C. became 6, 9, 9, and 6 mPa·s, respectively.

<Preparation of Ink Unit 6: Comparative Example>
(Preparation of Black Ink 6)

| | |
|---|---|
| C.I. Pigment Black 7 | 5 weight parts |
| Paraffin wax: 155 manufactured by Nippon Seiro Co. | 40 weight parts |
| Behenic acid: manufactured by Wako Junyaku Co. | 35 weight parts |
| Oleic acid amide: Fatty Acid Amide ON, manufactured by Kao Corp. | 20 weight parts |

Each of the above additives was heated to 150° C. and all were blended with each other whereby Black Ink 6 was prepared. The viscosity of Black Ink 6 at 80° C. was 15 mPa·s.

(Preparation of Cyan Ink 6)

| | |
|---|---|
| C.I. Pigment Blue 15:3 | 2.5 weight parts |
| Paraffin wax: 155 manufactured by Nippon Seiro Co. | 40 weight parts |
| Behenic acid: manufactured by Wako Junyaku Co. | 37.5 weight parts |
| Oleic acid amide: Fatty Acid Amide ON, manufactured by Kao Corp. | 20 weight parts |

Each of the above components was heated to 150° C. and all were blended with each other whereby Cyan Ink 6 was prepared. The viscosity of Black Ink 6 at 80° C. was 18 mPa·s.

(Preparation of Magenta Ink 6)

| | |
|---|---|
| C.I. Pigment Red 122 | 3 weight parts |
| Paraffin wax: 155 manufactured by Nippon Seiro Co. | 40 weight parts |
| Behenic acid: manufactured by Wako Junyaku Co. | 37 weight parts |
| Oleic acid amide: Fatty Acid Amide ON, manufactured by Kao Corp. | 20 weight parts |

Each of the above components was heated to 150° C. and all were blended with each other whereby Magenta Ink 6 was prepared. The viscosity of Magenta Ink 6 at 80° C. was 17 mPa·s.

(Preparation of Yellow Ink 6)

| | |
|---|---|
| C.I. Pigment Yellow 93 | 2.5 weight parts |
| Paraffin wax: 155 manufactured by Nippon Seiro Co. | 40 weight parts |
| Behenic acid: manufactured by Wako Junyaku Co. | 37.5 weight parts |
| Oleic acid amide: Fatty Acid Amide ON, manufacture by Kao Corp. | 20 weight parts |

Each of the above components was heated to 150° C. and all were blended with each other whereby Yellow Ink 6 was prepared. The viscosity of Yellow Ink 6 at 80° C. was 14 mPa·s.

<Preparation of Ink Unit 7: Comparative Example>
(Preparation of Black Ink 7)

| | |
|---|---|
| C.I. Pigment Black 7 | 5 weight parts |
| 1,6-Hexanediol diacrylate | 50 weight parts |
| 2-Phenoxyethyl acrylate | 35 weight parts |
| Reaction initiator: Irugacure 184 (manufactured by Ciba-Geigy Japan Ltd.) | 5 weight parts |
| 2-Phenoxyethanol | 5 weight parts |

Each of the above additives was blended with each other, whereby Black Ink 7 was prepared. The viscosity of Black Ink 7 at 80° C. was 13 mPa·s.

(Preparation of Cyan Ink 7)

| | |
|---|---|
| C.I. Pigment Blue 15:3 | 2.5 weight parts |
| 1,6-Hexanediol diacrylate | 50 weight parts |
| 2-Phenoxyethyl acrylate | 35 weight parts |
| Reaction initiator: Irugacure 184 (manufactured by Ciba-Geigy Japan Ltd.) | 7.5 weight parts |
| 2-Phenoxyethanol | 5 weight parts |

Each of the above additives was blended with each other, whereby Cyan Ink 7 was prepared. The viscosity of Cyan Ink 7 at 80° C. was 15 mPa·s.

(Preparation of Magenta Ink 7)

| | |
|---|---|
| C.I. Pigment Red 122 | 3 weight parts |
| 1,6-Hexanediol diacrylate | 50 weight parts |
| 2-Phenoxyethyl acrylate | 35 weight parts |
| Reaction initiator: Irugacure 184 (manufactured by Ciba-Geigy Japan Ltd.) | 7 weight parts |
| 2-Phenoxyethanol | 5 weight parts |

Each of the above additives was blended with each other, whereby Magenta Ink 7 was prepared. The viscosity of Magenta Ink 7 at 80° C. was 14 mPa·s.

(Preparation of Yellow Ink 7)

| | |
|---|---|
| C.I. Pigment Yellow 93 | 2.5 weight parts |
| 1,6-Hexanediol diacrylate | 50 weight parts |
| 2-Phenoxyethyl acrylate | 35 weight parts |
| Reaction initiator: Irugacure 184 (manufactured by Ciba-Geigy Japan Ltd.) | 7.5 weight parts |
| 2-Phenoxyethanol | 5 weight parts |

Each of the above additives was blended with each other, whereby Yellow 7 was prepared. The viscosity of Yellow Ink 7 at 80° C. was 10 mPa·s.

<Viscosity Measurement of Each Ink at 25° C.>

The viscosity of each color ink of Ink Units 1 through 7 at 25° C. was determined employing a rotational viscometer (manufactured by TOKIMEC Inc.). Table 1 shows the obtained results. Incidentally, the viscosity of each color ink of Ink Unit 6 was not determined due to it being in a solid state at 25° C.

<<Image Recording Method>>
(Ink-jet Printer)

The ink-jet recording apparatus constituted as shown in the aforesaid FIG. 1 was employed as an ink-jet printer.

(Recording Media)

Polyethylene terephthalate (PET) sheets, having a thickness of 60 µm, were employed. During printing, said PET sheets were maintained at normal temperature (being 25° C.)

(Image Printing)

Each ink unit, prepared as above, was placed in a special ink cartridge, and each said ink cartridge was installed in said ink-jet printer. Subsequently, images were printed onto said recording medium. Incidentally, printing was carried out in such a manner that the ink temperature of Ink Units 1 through 5 of the present invention was maintained at 80° C.; the ink temperature of Ink Unit 6 of the present invention was maintained at 150° C.; and the ink temperature of Ink Unit 7 of the present invention was maintained at room temperature.

As printing conditions of each color, the target density of each color was set as described below and 8 point characters and solid images were printed.

Yellow Density: 1.04

Magenta Density: 1.53

Cyan Density: 1.48

Black Density: 1.83

Incidentally, colorimetry of each of said colors was carried out employing a calorimeter (Spectrolino Keywizard, manufactured by Gretag Macbeth Co.) under the conditions described below:

Light source: D50

Visual field: 2° field

Density: ANSI T

White standard: abs

Filter: not used.

(Ultraviolet Radiation Exposure Treatment)

After printing was carried out onto a recording medium as above, exposure to ultraviolet radiation was carried out under the conditions described below.

A lamp used for exposure of ultraviolet radiation was of a metal halide type, and a lamp having a wavelength of 365 nm was employed. Ultraviolet radiation was exposed at an amount of 1,000 mJ/cm$^2$.

magnifying lens and evaluated. The text quality was then evaluated based on the criteria described below.

A: jaggedness was not noticed and the dot shape was circular

B: slight jaggedness was noticed but the dot shape was circular, as desired

C jaggedness was noticed and the dot shape deviated slightly from the circular

D: jaggedness was clearly noticed and the dot shape deviated from the circular.

(Evaluation of Color Bleeding)

Adjacent dots of different colors were magnified with a magnifying lens and evaluated. The bleeding was then evaluated based on the criteria described below.

A: Adjacent dot shapes were completely circular and no bleeding was observed

B: Adjacent dot shapes were almost circular and almost no bleeding was observed

C: Adjacent dot shapes were slightly deformed circular and slight bleeding was observed, but acceptable for practical use D: Adjacent dots bleed with each other and are not acceptable for practical use (Evaluation of Image Retaining Properties)

After printing a solid image of each color, the printed image was transferred onto Tokubishi art paper. Subsequently scratch resistance was determined employing a 0.8 mmR sapphire needle and a scratch tester HEIDON-18 (manufactured by HEIDON Co.). Under a specific load, a 10 cm scratch test was repeated 3 times. A maximum load, which resulted in no spots in which the scratch reached the support, was defined as the scratch resistance. The image durability was evaluated based on the criteria described below, utilizing the measured values.

A: scratch resistance was at least 200 g

B: scratch resistance was from at least 100 to less than 200 g

C: scratch resistance was less than 100 g

Each of the evaluation results obtained as above is shown in Table 1.

TABLE 1

| Ink Unit No. | Ink Viscosity (mPa · s/25° C.) | | | | Ink Viscosity (mPa · s/80° C.) | | | | Image Evaluation Resultes | | | Re-marks |
|---|---|---|---|---|---|---|---|---|---|---|---|---|
| | K | C | M | Y | K | C | M | Y | Text Quality | Color Bleeding | Image Durability | |
| 1 | 15000 | 14500 | 15500 | 14000 | 20 | 23 | 23 | 20 | B | A | B | Inv. |
| 2 | 45000 | 45500 | 45000 | 44500 | 18 | 20 | 20 | 18 | C | A | B | Inv. |
| 3 | 30000 | 29500 | 30000 | 29000 | 15 | 17 | 17 | 15 | C | A | A | Inv. |
| 4 | 10000 | 9500 | 10000 | 9500 | 10 | 12 | 12 | 10 | B | A | A | Inv. |
| 5 | 5000 | 4500 | 4500 | 5000 | 6 | 9 | 9 | 6 | A | A | A | Inv. |
| 6 | — | — | — | — | 15 | 18 | 17 | 14 | D | A | D | Comp. |
| 7 | 15 | 17 | 16 | 13 | 13 | 15 | 14 | 10 | D | D | C | Comp. |

Inv.: Present Invention
Comp.: Comparative Example

<<Evaluation of Output Images>>

(Evaluation of Text Quality)

Jagged connection of the periphery of 8 point characters, which had been printed at the target density using black ink, was evaluated for the smoothness of the edges. Further the individual dot shape of each color was magnified with a As can clearly be seen from Table 1, the ink of the present invention, which had a viscosity of 500 to 50,000 mPa·s at 25° C., and of 3 to 30 mPa·s at 80° C., formed a printing image which exhibited better text quality, less color bleeding and better image durability compared to the comparative examples.

The present invention is capable of providing an ink which attains marked excellence in ink stability, bleeding resistance, and durability (abrasion resistance), a recording method employing the same, an ink-jet recording method, an ink cartridge, a recording unit, and an ink-jet recording apparatus.

Example 2

<<Preparation of Ink Compositions>>

(Preparation of Ink Unit 1)

(Preparation of Black Ink 1)

| | |
|---|---|
| C.I. Pigment Black 7 (average dispersion particle diameter: 200 nm) | 5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Diethylene glycol | amount to adjust the viscosity (at 80° C.) to the value described in Table 1 |
| Sodium dimethylsulfosuccinate | amount to adjust the surface tension to the value described in Table 1 |
| NaOH | amount to adjust the pH to the value described in Table 1 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Black Ink (K) 1 was prepared. Incidentally, the viscosity was determined employing a rotational viscometer (manufactured by TOKIMEC Corp.)

(Preparation of Cyan Ink 1)

| | |
|---|---|
| C.I. Pigment Blue 15:3 (average dispersion particle diameter: 200 nm) | 2.5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Diethylene glycol | amount to adjust the viscosity (at 80° C.) to the value described in Table 1 |
| Sodium dimethylsulfosuccinate | amount to adjust the surface tension to the value described in Table 1 |
| NaOH | amount to adjust the pH to the value described in Table 1 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was while heated filtered employing a filter and subsequently was cooled, whereby viscous Cyan Ink (C) 1 was prepared.

(Preparation of Magenta Ink 1)

| | |
|---|---|
| C.I. Pigment Red 122 (average dispersion particle diameter: 200 nm) | 3 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Diethylene glycol | amount to adjust the viscosity (at 80° C.) to the value described in Table 1 |
| Sodium dimethylsulfosuccinate | amount to adjust the surface tension to the value described in Table 1 |
| NaOH | amount to adjust the pH to the value described in Table 1 |
| Reaction initiator: Irugacure 184 (manufactured by Ciba-Geigy Japan Ltd.) | 7 weight parts |

After blending each component above, the resultant mixture was heated to 80° C. and mix-stirred. The resultant liquid was filtered while heated employing a filter and subsequently was cooled, whereby viscous Magenta Ink (M) 1 was prepared.

(Preparation of Yellow Ink 1)

| | |
|---|---|
| C.I. Pigment Yellow 93 (average dispersion particle diameter: 200 nm) | 2.5 weight parts |
| Photopolymerizable compound: A-9300 (manufactured by Shin-Nakamura Kagaku Co.) | 75 weight parts |
| Photopolymerizable compound: EA-1020 (manufactured by Shin-Nakamura Kagaku Co.) | 15 weight parts |
| Diethylene glycol | amount to adjust the viscosity (at 80° C.) to the value described in Table 1 |
| Sodium dimethylsulfosuccinate | amount to adjust the surface tension to the value described in Table 1 |
| NaOH | amount to adjust the pH to the value described in Table 1 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Yellow Ink (Y) 1 was prepared.

(Preparation of Ink Unit 2)

Black Ink 2, Cyan Ink 2, Magenta Ink 2, and Yellow Ink 2 were prepared in the same manner as said Black Ink 1, Cyan Ink 1, Magenta Ink 1, and Yellow Ink 1, except that the added amount of diethylene glycol was suitably varied so that the viscosity at 80° C. was 18, 20, 20, and 18 mPa·s, respectively.

(Preparation of Ink Unit 3)

Black Ink 3, Cyan Ink 3, Magenta Ink 3, and Yellow Ink 3 were prepared in the same manner as said Black Ink 1, Cyan Ink 1, Magenta Ink 1, and Yellow Ink 1, except that the average dispersion particle diameter of each pigment was changed from 200 nm to 100 nm.

(Preparation of Ink Unit 4)

Black Ink 4, Cyan Ink 4, Magenta Ink 4, and Yellow Ink 4 were prepared in the same manner as said Black Ink 1, Cyan Ink 1, Magenta Ink 1, and Yellow Ink 1, except that the added amount of each pigment was varied to 15 weight parts (B), 12 weight parts (C), 15 weight parts (M), and 12 weight parts (Y), respectively.

(Preparation of Ink Unit 5)

(Preparation of Black Ink 5)

| | |
|---|---|
| C.I. Pigment Black 7 (average dispersion particle diameter: 200 nm) | 5 weight parts |
| Photopolymerizable compound: A-9300 (manufactured by Shin-Nakamura Kagaku Co.) | 51 weight parts |
| Photopolymerizable compound: EA-1020 (manufactured by Shin-Nakamura Kagaku Co.) | 15 weight parts |
| Octyl acrylate | 14 weight parts |
| Diethylene glycol | amount to adjust the viscosity (at 80° C.) to the described in Table 1 |
| Sodium dimethylsulfosuccinate | amount to adjust the surface tension to the values described in Table 1 |
| NaOH | amount to adjust the pH to the value described in Table 1 |
| Reaction initiator: Irugacure 184 (manufactured by Ciba-Geigy Japan Ltd.) | 5 weight parts |

After blending each component above, the resultant mixture was heated to 80° C. and mix-stirred. The resultant liquid was filtered while heated employing a filter and subsequently was cooled, whereby viscous Black Ink 5 was prepared.

(Preparation of Cyan Ink 5)

| | |
|---|---|
| C.I. Pigment Blue 15:3 (average dispersion particle diameter: 200 nm) | 2.5 weight parts |
| Photopolymerizable compound: A-9300 (manufactured by Shin-Nakamura Kagaku Co.) | 51 weight parts |
| Photopolymerizable compound: EA-1020 (manufactured by Shin-Nakamura Kagaku Co.) | 15 weight parts |
| Octyl acrylate | 14 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Cyan Ink 5 was prepared.

(Preparation of Magenta Ink 5)

| | |
|---|---|
| C.I. Pigment Red 122 (average dispersion particle diameter: 200 nm) | 3 weight parts |
| Photopolymerizable compound: A-9300 (manufactured by Shin-Nakamura Kagaku Co.) | 51 weight parts |
| Photopolymerizable compound: EA-1020 (manufactured by Shin-Nakamura Kagaku Co.) | 15 weight parts |
| Octyl acrylate | 14 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7 weight parts |

After blending each component above, the resultant mixture was heated to 80° C. and mix-stirred. The resultant liquid was filtered while heated employing a filter and subsequently was cooled, whereby viscous Magenta Ink 5 was prepared.

(Preparation of Yellow Ink 5)

| | |
|---|---|
| C.I. Pigment Yellow 93 (average dispersion particle diameter: 200 nm) | 2.5 weight parts |
| Photopolymerizable compound: A-9300 (manufactured by Shin-Nakamura Kagaku Co.) | 51 weight parts |
| Photopolymerizable compound: EA-1020 (manufactured by Shin-Nakamura Kagaku Co.) | 15 weight parts |
| Octyl acrylate | 14 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Yellow Ink 5 was prepared.

(Preparation of Ink Unit 6)

(Preparation of Black Ink 6)

| | |
|---|---|
| C.I. Pigment Black 7 (average dispersion particle diameter: 200 nm) | 5 weight parts |
| Photopolymerizable compound: A-9300 (manufactured by Shin-Nakamura Kagaku Co.) | 90 weight parts |
| Diethylene glycol | amount to adjust the viscosity (at 80° C.) to the value described in Table 2 |
| Sodium dimethylsulfosuccinate | amount to adjust the surface tension to the value described in Table 2 |

-continued

| | |
|---|---|
| NaOH | amount to adjust the pH to the value described in Table 2 |
| Reaction initiator: Irugacure 184 (manufactured by Ciba-Geigy Japan Ltd.) | 5 weight parts |

After blending each component above, the resultant mixture was heated to 80° C. and mix-stirred. The resultant liquid was filtered employing a filter while heated and subsequently was cooled, whereby viscous Black Ink 6 was prepared. Incidentally, the viscosity was determined employing a rotational viscometer (manufactured by TOKIMEC Corp.)

(Preparation of Cyan Ink 6)

| | |
|---|---|
| C.I. Pigment Blue 15:3 (average dispersion particle diameter: 200 nm) | 2.5 weight parts |
| Photopolymerizable compound: A-9300 (manufactured by Shin-Nakamura Kagaku Co.) | 90 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered employing a filter while heated and subsequently was cooled, whereby viscous Cyan Ink 6 was prepared.

(Preparation of Magenta Ink 6)

| | |
|---|---|
| C.I. Pigment Red 122 (average dispersion particle diameter: 200 nm) | 3 weight parts |
| Photopolymerizable compound: A-9300 (manufactured by Shin-Nakamura Kagaku Co.) | 90 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7 weight parts |

After blending each component above, the resultant mixture was heated to 80° C. and mix-stirred. The resultant liquid was filtered employing a filter while heated and subsequently was cooled, whereby a viscous Magenta Ink 6 was prepared.

(Preparation of Yellow Ink 6)

| | |
|---|---|
| C.I. Pigment Yellow 93 (average dispersion particle diameter: 200 nm) | 2.5 weight parts |
| Photopolymerizable compound: A-9300 (manufactured by Shin-Nakamura Kagaku Co.) | 90 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered employing a filter while heated and subsequently was cooled, whereby a viscous Yellow Ink 6 was prepared.

(Preparation of Cyan Ink 7)

Black Ink 7, Cyan Ink 7, Magenta Ink 7, and Yellow Ink 7 were prepared in the same manner as Black Ink 1, Cyan Ink 1, Magenta Ink 1, and Yellow Ink 1, except that the added amount of NaOH was varied so that the pH of each ink at 80° C. was varied from 6.5 to 4.5.

(Preparation of Ink Unit 8)

(Preparation of Black Ink 8)

| | |
|---|---|
| C.I. Pigment Black 7 (average dispersion particle diameter: 200 nm) | 5 weight parts |
| Photopolymerizable compound: A-9300 (manufactured by Shin-Nakamura Kagaku Co.) | 55 weight parts |
| Photopolymerizable compound: EA-1020 (manufactured by Shin-Nakamura Kagaku Co.) | 15 weight parts |
| Vehicle: carnauba wax | 20 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 5 weight parts |

After blending each component above, the resultant mixture was heated to 80° C. and mix-stirred. The resultant liquid was filtered while heated employing a filter and subsequently was cooled, whereby viscous Black Ink 8 was prepared (Preparation of Cyan Ink 8)

| | |
|---|---|
| C.I. Pigment Blue 15:3 (average dispersion particle diameter: 200 nm) | 2.5 weight parts |

-continued

| | |
|---|---|
| Photopolymerizable compound: A-9300 (manufactured by Shin-Nakamura Kagaku Co.) | 55 weight parts |
| Photopolymerizable compound: EA-1020 (manufactured by Shin-Nakamura Kagaku Co.) | 15 weight parts |
| Vehicle: carnauba wax | 20 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Cyan Ink 8 was prepared.

(Preparation of Magenta Ink 8)

| | |
|---|---|
| C.I. Pigment Red 122 (average dispersion particle diameter: 200 nm) | 3 weight parts |
| Photopolymerizable compound: A-9300 (manufactured by Shin-Nakamura Kagaku Co.) | 55 weight parts |
| Photopolymerizable compound: EA-1020 (manufactured by Shin-Nakamura Kagaku Co.) | 15 weight parts |
| Vehicle: carnauba wax | 20 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7 weight parts |

After blending each component above, the resultant mixture was heated to 80° C. and mix-stirred. The resultant liquid was filtered while heated employing a filter and subsequently was cooled, whereby viscous Magenta Ink 8 was prepared.

(Preparation of Yellow Ink 8)

| | |
|---|---|
| C.I. Pigment Yellow 93 (average dispersion particle diameter: 200 nm) | 2.5 weight parts |
| Photopolymerizable compound: A-9300 (manufactured by Shin-Nakamura Kagaku Co.) | 55 weight parts |
| Photopolymerizable compound: EA-1020 (manufactured by Shin-Nakamura Kagaku Co.) | 15 weight parts |
| Vehicle: carnauba wax | 20 weight parts |
| Diethylene glycol | amount to adjust the viscosity (at 80° C.) to the value described in Table 2 |
| Sodium dimethylsulfosuccinate | amount to adjust the surface tension to the value described in Table 2 |
| NaOH | amount to adjust the pH to the value described in Table 2 |
| Reaction initiator: Irugacure 184 (manufactured by Ciba-Geigy Japan Ltd.) | 7.5 weight parts |

After blending each component above, the resultant mixture was heated to 80° C. and mix-stirred. The resultant liquid was filtered while heated employing a filter and subsequently was cooled, whereby viscous Yellow Ink 8 was prepared.

(Preparation of Ink Unit 9)

(Preparation of Black Ink 9)

| | |
|---|---|
| C.I. Pigment Black 7 | 5 weight parts |
| Paraffin wax: 155, manufactured by Nippon Seiro | 40 weight parts |
| Behenic acid: manufactured by Wako Junyaku Co. | 35 weight parts |
| Oleic acid amide: fatty acid amide ON, manufactured by Kao Corp. | 20 weight parts |
| Sodium dimethylsulfosuccinate | amount to adjust the surface tension to the value described in Table 2 |
| NaOH | amount to adjust the pH to the value described in Table 2 |

Each of additives above was heated to 150° C. and mixed with each other, whereby Black Ink 9 was prepared. The viscosity of said Black Ink 9 at 80° C. was 15 mPa·s. Incidentally, the pH as well as the surface tension was determined at 140° C.

(Preparation of Cyan Ink 9)

| | |
|---|---|
| C.I. Pigment Blue 15:3 | 2.5 weight parts |
| Paraffin wax: 155, manufactured by Nippon Seiro | 40 weight parts |
| Behenic acid: manufactured by Wako Junyaku Co. | 37.5 weight parts |
| Oleic acid amide: fatty acid amide ON, manufactured by Kao Corp. | 20 weight parts |
| Sodium dimethylsulfosuccinate | amount to adjust the surface tension to the value described in Table 2 |
| NaOH | amount to adjust the pH to the value described in Table 2 |

Each of additives above was heated to 150° C. and mixed with each other, whereby Cyan Ink 9 was prepared. The viscosity of said Cyan Ink 9 at 80° C. was 18 mPa·s. Incidentally, the pH as well as the surface tension was determined at 140° C.

(Preparation of Magenta Ink 9)

| | |
|---|---|
| C.I. Pigment Red 122 | 3 weight parts |
| Paraffin wax: 155, manufactured by Nippon Seiro | 40 weight parts |
| Behenic acid: manufactured by Wako Junyaku Co. | 37 weight parts |

| | |
|---|---|
| Oleic acid amide: fatty acid amide ON, manufactured by Kao Corp. | 20 weight parts |
| Sodium dimethylsulfosuccinate | amount to adjust the surface tension to the value described in Table 2 |
| NaOH | amount to adjust the pH to the value described in Table 2 |

Each of additives above was heated to 150° C. and mixed with each other, whereby Magenta Ink 9 was prepared. The viscosity of said Magenta Ink 9 at 80° C. was 17 mPa·s. Incidentally, the pH as well as the surface tension was determined at 140° C.

(Preparation of Yellow Ink 9)

| | |
|---|---|
| C.I. Pigment Yellow 93 | 2.5 weight parts |
| Paraffin wax: 155, manufactured by Nippon Seiro | 40 weight parts |
| Behenic acid: manufactured by Wako Junyaku Co. | 37.5 weight parts |
| Oleic acid amide: fatty acid amide ON, manufactured by Kao Corp. | 20 weight parts |
| Sodium dimethylsulfosuccinate | amount to adjust the surface tension to the value described in Table 2 |
| NaOH | amount to adjust the pH to the value described in Table 2 |

Each of additives above was heated to 150° C. and mixed with each other, whereby Yellow Ink 9 was prepared. The viscosity of said Yellow Ink 9 at 80° C. was 14 mPa·s. Incidentally, the pH as well as the surface tension was determined at 140 ° C.

(Preparation of Ink Unit 10)

(Preparation of Black Ink 10)

| | |
|---|---|
| C.I. Pigment Black 7 | 5 weight parts |
| 1,6-Hexanediol acrylate | 50 weight parts |
| 2-Phenoxyethyl acrylate | 35 weight parts |
| Reaction initiator: Irugacure 184 (manufactured by Ciba-Geigy Japan Ltd.) | 5 weight parts |
| Sodium dimethylsulfosuccinate | amount to adjust the surface tension to the value described in Table 2 |
| NaOH | amount to adjust the pH to the value described in Table 2 |
| 2-Phenoxyethanol | 5 weight parts |

Each additive above was mixed with each other, whereby Black Ink 10 was prepared. The viscosity of said Black Ink 10 at 80° C. was 13 mPa·s.

(Preparation of Cyan Ink 10)

| | |
|---|---|
| C.I. Pigment Blue 15:3 | 2.5 weight parts |
| 1,6-Hexanediol acrylate | 50 weight parts |
| 2-Phenoxyethyl acrylate | 35 weight parts |
| Reaction initiator: Irugacure 184 (manufactured by Ciba-Geigy Japan Ltd.) | 7.5 weight parts |
| Sodium dimethylsulfosuccinate | amount to adjust the surface tension to the value described in Table 2 |
| NaOH | amount to adjust the pH to the value described in Table 2 |
| 2-Phenoxyethanol | 5 weight parts |

Each additive above was mixed with each other, whereby Cyan Ink 10 was prepared. The viscosity of said Cyan Ink 10 at 80° C. was 15 mPa·s.

(Preparation of Magenta Ink 10)

| | |
|---|---|
| C.I. Pigment Red 122 | 3 weight parts |
| 1,6-Hexanediol acrylate | 50 weight parts |
| 2-Phenoxyethyl acrylate | 35 weight parts |
| Reaction initiator: Irugacure 184 (manufactured by Ciba-Geigy Japan Ltd.) | 7 weight parts |
| Sodium dimethylsulfosuccinate | amount to adjust the surface tension to the value described in Table 2 |
| NaOH | amount to adjust the pH to the value described in Table 2 |
| 2-Phenoxyethanol | 5 weight parts |

Each additive above was mixed with each other, whereby Magenta Ink 10 was prepared. The viscosity of said Magenta Ink 10 at 80° C. was 14 mPa·s.

(Preparation of Yellow Ink 10)

| | |
|---|---|
| C.I. Pigment yellow 93 | 2.5 weight parts |
| 1,6-Hexanediol acrylate | 50 weight parts |
| 2-Phenoxyethyl acrylate | 35 weight parts |
| Reaction initiator: Irugacure 184 (manufactured by Ciba-Geigy Japan Ltd.) | 7.5 weight parts |
| Sodium dimethylsulfosuccinate | amount to adjust the surface tension to the value described in Table 2 |
| NaOH | amount to adjust the pH to the value described in Table 2 |
| 2-Phenoxyethanol | 5 weight parts |

Each additive above was mixed with each other, whereby Yellow Ink 10 was prepared. The viscosity of said Yellow Ink 10 at 80° C. was 10 mPa·s.

(Preparation of Ink Unit 11: Comparative Example)

Black Ink 11, Cyan Ink 11, Magenta Ink 11, and Yellow Ink 11 were prepared in the same manner as said Black Ink 1, Cyan Ink 1, Magenta Ink 1, and Yellow Ink 1, except that the added amount of sodium dimethylsulfosuccinate was suitably varied so that each surface tension was 18, 19, 19, and 18 mN/m, respectively.

(Measurement of Viscosity of Each Ink at 25° C.)

The viscosity of each color ink of Ink Units 1 through 11, prepared as above, was determined at 25° C., employing a rotational viscometer (manufactured by TOKIMEC Ltd.). Table 2 shows the obtained results. Incidentally, the viscosity of each color ink of Ink Unit 9 was not determined due to solid state at 25° C.

TABLE 2

| Ink Unit | | 1 | 2 | 3 | 4 | 5 | 6 | 7 | 8 | 9 | 10 | 11 |
|---|---|---|---|---|---|---|---|---|---|---|---|---|
| Ink Viscosity (mPa · s/25° C.) | K | 45000 | 15000 | 45000 | 45000 | 45000 | 45000 | 45000 | 45000 | — | 15 | 45000 |
| | C | 45500 | 14500 | 45500 | 45500 | 45500 | 45500 | 45500 | 45500 | — | 17 | 45500 |
| | M | 45000 | 15500 | 45000 | 45000 | 45000 | 45000 | 45000 | 45000 | — | 16 | 45000 |
| | Y | 44500 | 14000 | 44500 | 44500 | 44500 | 44500 | 44500 | 44500 | — | 13 | 44500 |
| Ink Viscosity (mPa · s/80° C.) | K | 20 | 18 | 20 | 25 | 18 | 18 | 20 | 28 | 15 | 13 | 20 |
| | C | 23 | 20 | 23 | 27 | 21 | 20 | 23 | 30 | 18 | 15 | 23 |
| | M | 23 | 20 | 23 | 27 | 21 | 20 | 23 | 30 | 17 | 14 | 23 |
| | Y | 20 | 18 | 20 | 24 | 18 | 18 | 20 | 27 | 14 | 10 | 20 |
| Surface Tension (mN/m) | K | 40 | 40 | 40 | 40 | 40 | 40 | 40 | 40 | 40 | 30 | 18 |
| | C | 42 | 42 | 42 | 42 | 42 | 42 | 42 | 42 | 42 | 31 | 19 |
| | M | 42 | 42 | 42 | 42 | 42 | 42 | 42 | 42 | 42 | 31 | 19 |
| | Y | 40 | 40 | 40 | 40 | 40 | 40 | 40 | 40 | 40 | 30 | 18 |
| Average Dispersion Particle Diameter (nm) | K | 200 | 200 | 100 | 200 | 200 | 200 | 200 | 200 | 200 | 200 | 200 |
| | C | 200 | 200 | 100 | 200 | 200 | 200 | 200 | 200 | 200 | 200 | 200 |
| | M | 200 | 200 | 100 | 200 | 200 | 200 | 200 | 200 | 200 | 200 | 200 |
| | Y | 200 | 200 | 100 | 200 | 200 | 200 | 200 | 200 | 200 | 200 | 200 |
| Proportion of Compound Having One polymerizable Group (%) | K | 0 | 0 | 0 | 0 | 17 | 0 | 0 | 0 | — | 41 | 0 |
| | C | 0 | 0 | 0 | 0 | 17 | 0 | 0 | 0 | — | 41 | 0 |
| | M | 0 | 0 | 0 | 0 | 17 | 0 | 0 | 0 | — | 41 | 0 |
| | Y | 0 | 0 | 0 | 0 | 17 | 0 | 0 | 0 | — | 41 | 0 |
| pH | K | 6.5 | 6.5 | 6.5 | 6.5 | 6.5 | 6.5 | 4.5 | 6.5 | 6.5 | 6.5 | 6.5 |
| | C | 6.5 | 6.5 | 6.5 | 6.5 | 6.5 | 6.5 | 4.5 | 6.5 | 6.5 | 6.5 | 6.5 |
| | M | 6.5 | 6.5 | 6.5 | 6.5 | 6.5 | 6.5 | 4.5 | 6.5 | 6.5 | 6.5 | 6.5 |
| | Y | 6.5 | 6.5 | 6.5 | 6.5 | 6.5 | 6.5 | 4.5 | 6.5 | 6.5 | 6.5 | 6.5 |

<<Image Recording Method>>
(Ink-jet Printer)

The ink-jet recording apparatus, which was constituted as shown in the aforesaid FIG. 1, was employed as an ink-jet printer.

(Recording Medium)

A 60 μm thick polyethylene terephthalate (PET) sheet was employed. During printing, said PET sheet was maintained at normal temperature (25° C.).

(Image Printing)

Each ink unit prepared as above was placed in a special ink cartridge, and each said ink cartridge was installed in said ink-jet printer. Subsequently, images were printed onto said recording medium. Incidentally, printing was carried out in such a manner that the ink temperature of Ink Units 1 through 8, as well as comparative Ink Unit 11, was maintained at 80° C.; the ink temperature of Ink Unit 9 was maintained at 150° C.; and the ink temperature of Ink Unit 10 was maintained at room temperature.

The printing conditions of each color were as follows: the target density of each color was set as described below, and 8 point characters and solid images were printed.

Yellow density: 1.04

Magenta density: 1.53

Cyan density: 1.48

Black density: 1.83

Incidentally, colorimetry of each of said colors was carried out employing a colorimeter (Spectrolino Keywizard, manufactured by Gretag Macbeth Co.) under the conditions described below:

Light source: D50

Visual field: 2° field

Density: ANSI T

White standard: abs

Filter: not used.

(Ultraviolet Radiation Exposure Treatment)

After printing was carried out onto a recording medium as above, ultraviolet radiation was exposed under the conditions described below.

A lamp used for exposure of ultraviolet radiation was of a metal halide type, and a lamp having a wavelength of 365 nm was employed. Ultraviolet radiation was exposed at an amount of 1,000 mJ/cm$^2$.

<<Evaluation of Printed Images>>
(Evaluation of Text Quality)

Jaggedness of the periphery of 8 point characters, which had been printed at the target density using black ink, was evaluated. Further a simple dot shape of each color was magnified by a magnifying lens and evaluated. The text quality was then evaluated based on the criteria described below.

A: jaggedness was not noticed and the dot shape was circular

B: slight jaggedness was noticed but the dot shape was circular, as desired

C jaggedness was noticed and the dot shape deviated slightly from the circular

D: jaggedness was clearly noticed and the dot shape deviated from the circular.

(Evaluation of Color Bleeding)

Adjacent dots of different colors were magnified with a magnifying lens and evaluated. The bleeding was then evaluated based on the criteria described below.

A: Adjacent dot shapes were completely circular and no bleeding was observed

B: Adjacent dot shapes were almost circular and almost no bleeding was observed

C: Adjacent dot shapes were slightly deformed circular and slight bleeding was observed, but acceptable for practical use D: Adjacent dots bleed with each other and are not acceptable for practical use (Evaluation of Image Durability)

After printing a solid image of each color, the printed image was transferred onto Tokubishi art paper. Subsequently scratch resistance was determined employing a 0.8 mmR sapphire needle and a scratch tester HEIDON-18 (manufactured by HEIDON Co.). Under the definite load, a 10 cm scratch test was repeated 3 times. A maximum load which resulted in no spot, in which the scratch reached the support, was defined as scratch resistance. The image durability was evaluated based on the criteria described below, utilizing the measured values.

A: scratch resistance was at least 200 g
B: scratch resistance was from to at least 100 to less than 200 g
C: scratch resistance was less than 100 g (Storage Stability of Ink)

Each ink prepared as above was placed in a test tube and was put aside at 80° C. for 3 days. Thereafter, the resultant sedimentation was visually evaluated based on the criteria described below.

A: sedimentaion of the pigment was not noticed in the ink
B: sedimentaion of the pigment was noticed but was at the level which did not adversely affect printing
C: the large amount of sedimentation of the pigment was noticed and was at the level which adversely affected printing.

Each of evaluation results obtained as above is shown in Table 3.

TABLE 3

| Ink Unit No. | Text Quality Rank | Color Bleeding Rank | Image Durability Rank | Ink Storage Stability Rank |
|---|---|---|---|---|
| 1 | B | A | A | A |
| 2 | A | A | A | A |
| 3 | A | A | A | A |
| 4 | B | B | A | B |
| 5 | B | A | B | A |
| 6 | B | A | B | B |
| 7 | B | B | A | B |
| 8 | A | A | A | A |
| 9 | D | A | D | A |
| 10 | D | D | C | C |
| 11 | D | D | A | B |

Table 3 cleary shows that each ink of the present invention, which has a viscosity in the range of 500 to 50,000 mPa·s at 25° C. as well as in the range of 3 to 30 at 80 ° C. and a surface tension in the range of 20 to 60 mN/m, exhibits excellent text quality, minimizes color bleeding, and exhibits excellent image durability as well as excellent ink storage stability compared to comparative products.

Example 3

(Ink Compositions)

Ink compositions of the present invention described in Table 4 were heated to 80° C. and blended while stirring. Thereafter, while heated, the resultant mixture was filtered employing a filter and cooled, whereby a viscous ink composition of each color of K (black), C (cyan), M (magenta), and yellow (Y) was prepared.

Further, as Ink A, the ink compositions described in Table 4 were heated to 150° C. and blended, whereby solid ink of each color was prepared.

As Ink B, the ink compositions described in Table 4 were employed and blended without heating, whereby UV curable liquid ink was prepared.

As Ink C, the ink compositions described in Table 4 were employed and the ink of each color, comprising no oxidation polymerizable compositions, was prepared.

<Ink Viscosity>

Melt viscosity at 25° C. as well as 80° C. was determined employing a rotational viscometer (Model EDL, manufactured by TOKIMEC Ltd.). Incidentally, the viscosity of Comparative Ink A was determined at 150° C.

Table 4 shows the composition, viscosity, and surface tension of each ink.

TABLE 4

| Ink Sample | Each Compositon | | K (Black) Pigment Black 7 | C (Cyan) Pigment Blue 15:3 | M (Magenta) Pigment Red 122 | Y (Yellow) Pigment Yellow 93 | Measure Value |
|---|---|---|---|---|---|---|---|
| Ink Composition of the Present Invention | Amount of Coloring Material | | 5 | 2.5 | 3 | 2.5 | Viscosity at 25° C.: 48,000 mPa · s Viscosity at 80° C.: 18 mpa · s |
| | Photopolymerizable Compound | A-9300, manufactured by Shin-Nakamura Kagaku Co. | 71 | 71 | 71 | 71 | |
| | Photopolymerizable Compound | EA-1020, manufactured by Shin-Nakamura Kagaku Co. | 11 | 11 | 11 | 11 | Surface Tension at 80° C.: 50 mN/m |
| | Reaction Initiator | Irugacure 184, manufactured by Ciba-Geigy Japan Ltd. | 5 | 7.5 | 7 | 7.5 | |
| | Oxidation Polymerizable Compound | Modified Linseed Oil Alkyd Resin | 6 | 6 | 6 | 6 | |
| | Oxidation Polymerizable Compound | Cobalt Naphthenate | 2 | 2 | 2 | 2 | |

TABLE 4-continued

| Ink Sample | Each Compositon | | K (Black) Pigment Black 7 | C (Cyan) Pigment Blue 15:3 | M (Magenta) Pigment Red 122 | Y (Yellow) Pigment Yellow 93 | Measure Value |
|---|---|---|---|---|---|---|---|
| Ink A: Solid Ink Composition | Amount of Coloring Material | | 5 | 2.5 | 3 | 2.5 | 25° C.: solid |
| | Paraffin Wax | 155, manufactured by Nippon Seiro | 40 | 40 | 40 | 40 | Viscosity at 150° C.: 15 mPa · s |
| | Behenic Acid | Manufactured by Wako Junyaku | 35 | 35 | 35 | 35 | |
| | Oleic Acid Amide | Fatty Acid Amide ON, manufactured by Kao | 20 | 20 | 20 | 20 | |
| Ink B: UV Curable Ink Composition | Amount of Coloring Material | | 5 | 2.5 | 3 | 2.5 | Viscosity at 25° C.: 17 mPa · s Surface Tension at 80° C.: 40 mN/m |
| | 1,6-Hexanediol diacrylate | | 50 | 50 | 50 | 50 | |
| | 2-Phenoxyethyl acrylate | | 35 | 35 | 35 | 35 | |
| | Irugacure 184 | Manufactured by Ciba-Geigy Japan Ltd. | 5 | 7.5 | 7 | 7.5 | |
| | 2-Phenoxyethanol | | 5 | 5 | 5 | 5 | |
| Ink C: comprising no oxidation polymerizable compositions | Amount of Coloring Material | | 5 | 2.5 | 3 | 2.5 | Viscosity at 25° C.: 45,000 mPa · s Viscosity at 80° C.: 15 mPa · s Surface Tension at 80° C.: 48 mN/m |
| | Photopolymerizable Compound | A-9300, manufactured by Shin-Nakamura Kagaku Co. | 74 | 74 | 74 | 74 | |
| | Photopolymerizable Compound | EA-1020, manufactured by Shin-Nakamura Kagaku Co. | 16 | 16 | 16 | 16 | |
| | Reaction Initiator | Irugacure 184, manufactured by Ciba-Geigy Japan Ltd. | 5 | 7.5 | 7 | 7.5 | |

(Numerals are percent by weight.)

(Ink-jet Printer)

A large format ink-jet printer "IGUAZU 1044SD", manufactured by Konica Corp., was employed which was improved in such a manner that a unit, which blew cool air onto the surface of a recording material, as well as a sensor, which sensed the surface temperature of said recording material, were installed, and the channel which supplied ink to the printing head was subjected to temperature adjustment (set at 80° C.)

(Recording Material)

Images were formed, employing each of the aforesaid ink, under the conditions shown in Table 2, on each of the recording materials (biaxially stretched polypropylene (OPP, having a thickness of 30 μm, biaxially stretched polystyrene (OPS, having a thickness of 25 μm), and polyethylene terephthalate (PET, having a thickness of 12.5 μm), aluminum, (having a thickness of 10 μm), and plain paper), described in Table 5.

<Contact Angle>

The contact angle at 25° C. was determined employing an automatic contact angle measurement apparatus Type CA-Z, manufactured by Kyowa Kaimen Kagaku Co.

(Ultraviolet Radiation Exposure)

After printing, ultraviolet radiation was exposed under the conditions described below.

A lamp used for exposure of ultraviolet radiation was of a metal halide type, and a lamp having a wavelength of 365 nm was employed. Ultraviolet radiation was exposed at an amount of 1,000 mJ/cm$^2$.

(Evaluation Items)

(Image Durability 1)

Immediately after printing, the resultant print was folded and peeling, breaking and cracking of the ink layer were visually evaluated.

A: good
B: good somewhat (at a somehow commercially viable level)
C: poor (Image Durability 2)

After printing a solid image of each color, the scratch resistance of each of the resultant recording materials was determined employing a 0.8 mmR sapphire needle and a scratch tester HEIDON-18 (manufactured by HEIDON Co.). Under the definite load, a 10 cm scratch test was repeated 3 times. A maximum load which resulted in no spots, in which the scratch reached the support, was defined as scratch resistance. The image durability was evaluated based on the criteria described below, utilizing the measured values.

A: scratch resistance was at least 200 g
B: scratch resistance was at least 100 g to less than 200 g
C: scratch resistance was less than 100 g (Text Quality)

A text was printed so that the size of characters was 8 point at K density of 1.8. Jaggedness connection of the periphery of 8 point characters as well as was the simple dot shape of each color was magnified by a magnifying glass and evaluated.

A: jaggedness was not noticed and the dot shape was circular
B: slight jaggedness was noticed but the dot shape was circular, as desired
C: jaggedness was noticed and the dot shape deviated slightly from the circular
D: jaggedness was clearly noticed and the dot shape deviated from the circular.

(Color Bleeding)

Adjacent dots of different colors were magnified with a magnifying lens and evaluated. The bleeding was then evaluated based on the criteria described below.

A: Adjacent dot shapes were completely circular and no bleeding was observed
B: Adjacent dot shapes were almost circular and almost no bleeding was observed
C: Adjacent dot shapes were slightly deformed circular and slight bleeding was observed, but acceptable for practical use
D: Adjacent dots bleed with each other and are not acceptable for practical use Table 5 shows the evaluation results.

TABLE 5

| Sample No. | Ink | Recording Material | Corona Treatment | Contact Angle (degrees) | Surface Temperature Adjustment of Recording Material | UV Radiation Exposure after Image Formation | Image Durability 1 | Image Durability2 | Text Quality | Color Bleeding | Remarks |
|---|---|---|---|---|---|---|---|---|---|---|---|
| 1 | A | OPP | no | 60 | no | no | A | C | C | B | Comp. |
| 2 | A | OPS | no | 70 | no | no | A | C | C | B | Comp. |
| 3 | A | PET | no | 35 | no | no | A | C | B | C | Comp. |
| 4 | A | Aluminum | no | 51 | no | no | A | C | C | B | Comp. |
| 5 | A | Plain Paper | no | 70 | no | no | A | C | C | C | Comp. |
| 6 | B | OPP | no | 52 | no | yes | C | A | D | B | Comp. |
| 7 | B | OPS | no | 60 | no | yes | C | A | D | B | Comp. |
| 8 | B | PET | no | 20 | no | yes | C | A | C | D | Comp. |
| 9 | B | Aluminum | no | 40 | no | yes | C | A | C | B | Comp. |
| 10 | B | Plain Paper | no | 14 | no | yes | C | A | D | D | Comp. |
| 11 | C | OPP | no | 65 | no | yes | C | A | B | B | Inv. |
| 12 | C | OPS | no | 83 | no | yes | C | A | B | B | Inv. |
| 13 | C | PET | no | 30 | no | yes | C | A | B | C | Inv. |
| 14 | C | Aluminum | no | 50 | no | yes | C | A | B | B | Inv. |
| 15 | C | Plain Paper | no | 15 | no | yes | C | A | B | C | Inv. |
| 16 | Present Inv. | OPP | yes | 57 | no | yes | A | A | B | A | Present Inv. (Preferable Example) |
| 17 | Present Inv. | OPP | no | 68 | no | yes | A | A | C | A | Present Inv. |
| 18 | Present Inv. | OPS | yes | 63 | no | yes | A | A | B | B | Present Inv. (Preferable Example) |
| 19 | Present Inv. | OPS | no | 85 | no | yes | A | A | C | B | Present Inv. |
| 20 | Present Inv. | PET | yes | 26 | no | yes | A | A | A | B | Present Inv. (Preferable Example) |
| 21 | Present Inv. | PET | no | 33 | no | yes | A | A | B | C | Present Inv. |

TABLE 5-continued

| Sample No. | Ink | Recording Material | Corona Treatment | Contact Angle (degrees) | Surface Temperature Adjustment of Recording Material | UV Radiation Exposure after Image Formation | Image Durability 1 | Image Durability2 | Text Quality | Color Bleeding | Remarks |
|---|---|---|---|---|---|---|---|---|---|---|---|
| 22 | Present Inv. | PVC | yes | 56 | no | yes | A | A | B | A | Present Inv. (Preferable Example) |
| 23 | Present Inv. | aluminum | yes | 50 | no | yes | B | A | A | A | Present Inv. (Preferable Example) |
| 24 | Present Inv. | Plain Paper | yes | 17 | no | yes | A | A | A | B | Present Inv. (Preferable Example) |
| 25 | Present Inv. | OPP | yes | 57 | yes | yes | A | A | A | A | Present Inv. (More Preferable Example) |
| 26 | Present Inv. | OPS | yes | 63 | yes | yes | A | A | A | A | Present Inv. (More Preferable Example) |
| 27 | Present Inv. | OPP | yes | 57 | no | no | C | B | B | A | Comp. |

Comp.: Comparative
Inv.: Invention

It is found that the structure of the present invention resulted in excellent text quality; minimized color bleeding; and resulted in excellent image durability even though recording was carried out onto all the recording materials.

Example 4

Ink Composition

The ink composition of the present invention, described in Table 6, was heated to 80° C. and was blended while stirring. Thereafter, while heated, said composition was filtered employing a filter and was cooled, whereby a viscous ink composition was prepared.

Incidentally, Ink A was prepared in such a manner that solid ink was heated to 150° C. and was blended. Further Ink B was prepared in such a manner that UV curable liquid ink was blended without being heated.

TABLE 6

| Coloring Material | K Cl Pigment Black 7 | C Cl Pigment Blue 15:3 | M Cl Pigment Red 122 | Y Cl Pigment Yellow 93 |
|---|---|---|---|---|
| Ink Composition of the Present Invention Viscosity at 25° C.: 50 Pa · s and Viscosity at 80° C.: 0.015 Pa · s | | | | |
| Coloring Material | 5 | 2.5 | 3 | 2.5 |
| A-9300 (photopolymerizable compound), manufactured by Shin-Nakamura Kagaku Co.) | 75 | 75 | 75 | 75 |
| EA-1020 (photopolymerizable compound), manufactured by Shin-Nakamura Kagaku Co.) | 15 | 15 | 15 | 15 |
| Irugacure 184, manufactured by Ciba-Geigy Japan Ltd. (reaction initiator) | 5 | 7.5 | 7 | 7.5 |

TABLE 6-continued

|  | K Cl Pigment Black 7 | C Cl Pigment Blue 15:3 | M Cl Pigment Red 122 | Y Cl Pigment Yellow 93 |
|---|---|---|---|---|
| Coloring Material | | | | |
| Comparative Ink A: Solid Ink Composition 25° C.: Solid, Viscosity at 150° C.: 0.015 Pa · s | | | | |
| Paraffin Wax (155, manufactured by Nippon Seiro) 40% by weight | 40 | 40 | 40 | 40 |
| Behenic Acid (manufactured by Wako Junyaku Co.) 40% by weight | 35 | 35 | 35 | 35 |
| Oleic Acid Amide (Fatty Acid Amide ON, manufactured by Kao Corp.) 20% by weight | 20 | 20 | 20 | 20 |
| Comparative Ink B: UV Curing Ink Composition Viscosity at 25° C.: 0.017 Pa · s | | | | |
| 1,6-Hexanediol Diacrylate | 50 | 50 | 50 | 50 |
| 2-Phenoxyethyl Acrylate | 35 | 35 | 35 | 35 |
| Irugacure 184, manufactured by Ciba-Geigy Japan Ltd. | 5 | 7.5 | 7 | 7.5 |
| 2-Phenoxyethanol | 5 | 5 | 5 | 5 |

Regarding ink viscosity, melt viscosity at 25° C. and 80° C. was determined employing a rotational viscometer (Model EDL, manufactured by TOKIMEC Ltd.) As an ink-jet printer, a large format ink-jet printer "IGUAZU 1044SD", manufactured by Konica Corp., was employed which was improved in such a manner that a unit, which blew cool air onto the surface of a recording material, as well as a sensor, which sensed the surface temperature of said recording material, were installed, and the channel which supplied ink to the printing head was subjected to temperature adjustment (set at 80° C.).

Images were formed on each of recording materials (OPP, OPS, PET, aluminum, plain paper, and PVC), described in Table 2, under the conditions described in Table 2, employing the aforesaid ink.

Contact angle at 25° C. was determined employing an automatic contact angle measurement apparatus Type CA-Z, manufactured by Kyowa Kaimen Kagaku Co.

After printing, ultraviolet radiation was exposed under the conditions described below. The lamp for exposure was of a metal halide type having a wavelength of 365 nm. The exposure amount of the ultraviolet radiation was 1,000 mJ/cm$^2$.

The obtained samples were evaluated employing the methods described below. Table 7 shows the results.

(Text Quality)

A text was printed so that the size of characters was 8 point at target K density. Jaggedness of the periphery of 8 point characters as well as was a single dot shape of each color was magnified by a magnifying lens and evaluated.

A: jaggedness was not noticed and the dot shape was circular
B: slight jaggedness was noticed but the dot shape was circular, as desired
C: jaggedness was noticed and the dot shape deviated slightly from the circular
D: jaggedness was clearly noticed and the dot shape deviated from the circular.

(Color Bleeding)

Adjacent dots of different colors were magnified with a magnifying lens and evaluated. The bleeding was then evaluated based on the criteria described below.

A: Adjacent dot shapes were completely circular and no bleeding was observed
B: Adjacent dot shapes were almost circular and almost no bleeding was observed
C: Adjacent dot shapes were slightly deformed circular and slight bleeding was observed, but acceptable for practical use
D: Adjacent dots bleed with each other and are not acceptable for practical use (Evaluation of Image Durability)

After printing a solid image of each color, the transfer layer was transferred onto Tokubishi art paper. Subsequently, scratch resistance was determined employing a scratch tester HEIDON-18 (manufactured by HEIDON Co.) while using a 0.8 mmR sapphire needle. Under the definite load, a 10 cm scratch test was repeated 3 times. The maximum load, which resulted in no spot in which the scratch reached the support, was defined as scratch resistance. Said scratch resistance was evaluated based on the criteria described below, utilizing the measured values.

A: at least 200 g
B: at least 100 to less than 200 g
C: less than 100 g

TABLE 7

| Sample No. | Ink | Recording Material | Corona Treatment | Contact Angle (in degrees) | Temperature Adjustment of Recording Material Surface | UV Exposure after Image Formation | Text Quality | Color Bleeding | Image Durability | Remarks |
|---|---|---|---|---|---|---|---|---|---|---|
| 1 | Comp. A | OPP | yes | 60 | no | no | C | B | C | Comp. |
| 2 | Comp. A | OPS | yes | 70 | no | no | C | B | C | Comp. |
| 3 | Comp. A | PET | yes | 35 | no | no | B | C | C | Comp. |
| 4 | Comp. A | aluminum | yes | 51 | no | no | C | B | C | Comp. |
| 5 | Comp. A | plain paper | yes | 70 | no | no | C | C | C | Comp. |
| 6 | Comp. B | OPP | yes | 52 | no | yes | C | B | A | Comp. |
| 7 | Comp. B | OPS | yes | 60 | no | yes | C | B | A | Comp. |
| 8 | Comp. B | PET | yes | 20 | no | yes | B | D | A | Comp. |
| 9 | Comp. B | aluminum | yes | 40 | no | yes | C | B | A | Comp. |
| 10 | Comp. B | plain paper | yes | 14 | no | yes | C | D | A | Comp. |
| 11 | Inv. | OPP | yes | 55 | yes | yes | A | A | A | Inv. (more preferable example) |
| 12 | Inv. | OPP | no | 65 | yes | yes | B | A | A | Inv. |
| 13 | Inv. | OPS | yes | 60 | yes | yes | A | A | A | Inv. (more preferable example) |
| 14 | Inv. | OPS | no | 80 | yes | yes | B | A | A | Inv. |
| 15 | Inv. | PET | yes | 23 | yes | yes | A | B | A | Inv. (more preferable example) |
| 16 | Inv. | PET | no | 30 | yes | yes | B | A | A | Inv. |
| 17 | Inv. | PVC | yes | 54 | yes | yes | A | A | A | Inv. (more preferable example) |
| 18 | Inv. | aluminum | yes | 47 | yes | yes | A | A | A | Inv. (more preferable example) |
| 19 | Inv. | plain paper | yes | 15 | yes | yes | A | B | A | Inv. |
| 20 | Inv. | OPP | yes | 55 | no | yes | C | D | A | Comp. |
| 21 | Inv. | OPS | yes | 60 | no | yes | C | D | A | Comp. |
| 22 | Inv. | OPP | yes | 55 | yes | no | A | A | C | Comp. |

Comp.: Comparative
Inv.: Invention

Based on Table 7, the samples of the present invention showed that images, which resulted in excellent text quality, minimized color bleeding and exhibited excellent image durability were printed onto various the recording materials.

What is claimed is:

1. An ink-jet ink comprising a photopolymerizable compound, a photopolymerzation initiator and a colorant, wherein the ink has a viscosity of 500 to 10,000 mPa·s at 25° C. and a viscosity of 3 to 30 mPa·s at 80° C.

2. The ink of claim 1, wherein the colorant is a pigment.

3. An ink-jet recording method, comprising the steps of:
    (a) jetting the ink of claim 1 through a nozzle of an ink-jet head by heating the ink to 60 to 180° C. onto an image recording medium having a temperature of 15 to 40° C.; and
    (b) applying an actinic ray to the image recording medium after the jetting step.

4. The ink-jet recording method of claim 3, wherein the actinic ray is an ultraviolet ray.

5. The ink-jet recording method of claim 3, wherein the ink-jet head ejects the ink by an effect of piezoelectric action.

6. The ink-jet recording method of claim 3, wherein the image recording medium is not ink-absorptive.

7. An ink cartridge comprising an ink housing section which stores the ink of claim 1.

8. An ink-jet recording unit comprising an ink storing section which stores the ink of claim 1 and an ink-jet head section which ejects droplets of the ink.

9. The ink-jet recording unit of claim 8, wherein the ink-jet head section comprises an ink-jet head which ejects the ink by an effect of piezoelectric action of the head.

10. An ink-jet recording apparatus comprising the ink cartridge of claim 7, wherein recording is carried out by adhering ink droplets formed by an ink-jet system onto an ink-jet recording medium.

11. An ink-jet recording apparatus comprising the ink-jet recording unit of claim 8, wherein recording is carried out by jetting the ink onto an ink-jet recording medium.

12. The ink-jet recording apparatus of claim 11, wherein the apparatus comprises a means for irradiating ultraviolet rays onto the ink-jet recording medium.

13. The ink-jet ink of claim 1, wherein the ink has a surface tension of 20 to 60 mN/m.

14. The ink-jet ink of claim 13, wherein the colorant is a pigment and the content of the pigment is 0.5 to 30 weight % of the ink.

15. The ink-jet ink of claim 13, wherein the colorant is dispersed in a vehicle and has an average particle size of not more than 200 nm.

16. The ink-jet ink of claim 13, wherein the ink-jet ink comprises at least two kinds of photopolymerizable compounds having a different number of photopolymerizable groups.

17. The ink-jet ink of claim 16, wherein a weight ratio of a photopolymerizable compound having one photopolymerizable group to photopolymerizable compounds having a plurality of photopolymerizable groups is 0:100 to 50:50.

18. The ink-jet ink of claim 13, wherein the ink-jet ink has a pH value of 4 to 10.

19. The ink-jet ink of claim 13, wherein the ink-jet ink comprises a vehicle which is contained in a content of 1 to 50 weight % of the ink.

20. An ink-jet recording method, comprising the steps of:
 (a) jetting the ink of claim 13 through a nozzle of an ink-jet head by heating the ink to 60 to 180° C. onto an image recording medium having a temperature of 15 to 40° C.; and
 (b) applying an actinic ray to the image recording medium after the jetting step.

21. The ink-jet recording method of claim 20, wherein the actinic ray is an ultraviolet ray.

22. The ink-jet recording method of claim 20, wherein the ink-jet head ejects the ink by an effect of piezoelectric action.

23. The ink-jet recording method of claim 20, wherein the recording medium is not ink-absorptive.

24. The ink-jet ink of claim 1, wherein the ink further comprises a cationically polymerizable compound.

25. The ink-jet ink of claim 24, wherein the ink has a surface tension of 27 to 65 mN/m.

26. The ink-jet ink of claim 24, wherein the colorant is a pigment.

27. The ink-jet ink of claim 24, wherein the ink contains 30 to 95 weight % of the photopolymerizable compound, and the weight ratio of the photopolymerizable compound to the photopolymerizable initiator is 100:0.01 to 100:20, and the weight ratio of the photopolymerizable compound to the acid polymerizable compound is 100:5 to 100:30.

28. An ink-jet recording method, comprising the steps of:
 (a) providing an image recording medium in a form of a roll;
 (b) jetting the ink of claim 24 through a plurality of ink-jet heads onto the image recording medium; and
 (c) hardening the ink on the image recording medium by irradiation with an actinic ray or by heating.

29. The ink-jet recording method of claim 28, wherein the image recording medium is not ink-absorptive.

30. The ink-jet recording method of claim 28, wherein a contact angle of the ink jetted onto the recording medium is in a range of 20 to 70° at 25° C.

31. The ink-jet recording method of claim 28, wherein a surface of the recording medium is heated to 10 to 30° C. during the jetting step of the ink.

32. The ink-jet recording method of claim 31, wherein the temperature of the surface of the recording medium is regulated based on the amount of data contained in one sheet which is to be recorded.

33. An ink-jet recording method, comprising the steps of:
 (a) jetting the ink of claim 1 through a nozzle of an ink-jet head by heating the ink to 60 to 180°0 C. onto an image recording medium having the temperature of 15 to 40° C.; and
 (b) applying an actinic ray to the image recording medium after the jetting step, wherein the ink contains no wax.

34. The ink-jet recording method of claim 33, wherein the temperature of the surface of the recording medium is regulated based on the amount of data contained in one sheet which is to be recorded.

35. The ink-jet recording method of claim 33, wherein the recording medium is not ink-absorptive.

36. The ink-jet recording method of claim 33, wherein a contact angle of the ink jetted onto the recording medium is in a range of 20 to 70° at 25° C.

37. An ink-jet ink comprising a photopolymerizable compound, a photopolymerization initiator and a colorant, wherein the ink has a viscosity of 500 to 5,000 mPa·s at 25° C. and a viscosity of 3 to 30 mPa·s at 80° C.

* * * * *